United States Patent
Thanneerkulam Ravichandran et al.

(10) Patent No.: US 12,519,725 B2
(45) Date of Patent: Jan. 6, 2026

(54) VTEP MULTIPATH DATA TRAFFIC FORWARDING SYSTEM

(71) Applicant: Dell Products L.P., Round Rock, TX (US)

(72) Inventors: Sathish Kumar Thanneerkulam Ravichandran, Chennai (IN); Karthik Krishnamurthy, Chennai (IN)

(73) Assignee: Dell Products L.P., Round Rock, TX (US)

( * ) Notice: Subject to any disclaimer, the term of this patent is extended or adjusted under 35 U.S.C. 154(b) by 495 days.

(21) Appl. No.: 17/991,923

(22) Filed: Nov. 22, 2022

(65) Prior Publication Data

US 2024/0171514 A1    May 23, 2024

(51) Int. Cl.
*H04L 45/76* (2022.01)
*G06F 9/455* (2018.01)
*H04L 45/24* (2022.01)

(52) U.S. Cl.
CPC .......... *H04L 45/76* (2022.05); *G06F 9/45558* (2013.01); *H04L 45/24* (2013.01); *G06F 2009/45595* (2013.01)

(58) Field of Classification Search
CPC ..... H04L 45/24; H04L 45/76; H04L 12/4641; H04L 12/4633; G06F 9/45558
See application file for complete search history.

(56) References Cited

U.S. PATENT DOCUMENTS

| | | | |
|---|---|---|---|
| 9,246,821 B1* | 1/2016 | Li | H04L 47/125 |
| 2015/0281067 A1* | 10/2015 | Wu | H04L 41/122 370/392 |
| 2016/0149795 A1* | 5/2016 | Kang | H04L 45/74 370/254 |
| 2018/0062914 A1* | 3/2018 | Boutros | H04L 45/22 |
| 2018/0205623 A1* | 7/2018 | Gao | H04L 12/4633 |
| 2019/0036736 A1* | 1/2019 | Gao | H04L 12/4633 |
| 2020/0328914 A1* | 10/2020 | Liu | H04L 61/50 |
| 2022/0232109 A1* | 7/2022 | Chen | H04L 69/08 |
| 2023/0107891 A1* | 4/2023 | Miriyala | G06F 9/45558 370/254 |
| 2023/0208678 A1* | 6/2023 | Mathew | H04L 41/082 370/392 |

* cited by examiner

*Primary Examiner* — Jeong S Park
(74) *Attorney, Agent, or Firm* — Joseph Mencher

(57) ABSTRACT

A VTEP data traffic forwarding system includes a second VTEP device coupled to a data traffic provisioning device and a first VTEP device. The second VTEP device identifies a virtual machine directly coupled to the first VTEP device, associates a first VTEP device identifier for the first VTEP device in a database with a virtual machine identifier for the virtual machine, and identifies the association of the first VTEP device identifier and the virtual machine identifier to the data traffic provisioning device, with the association of the first VTEP device identifier and the virtual machine identifier causing the data traffic provisioning device to provide the first VTEP device identifier in data traffic destined for the virtual machine. The second VTEP device then receives data traffic including the first VTEP device identifier from the data traffic provisioning device and, in response, forwards the data traffic to the first VTEP device.

20 Claims, 18 Drawing Sheets

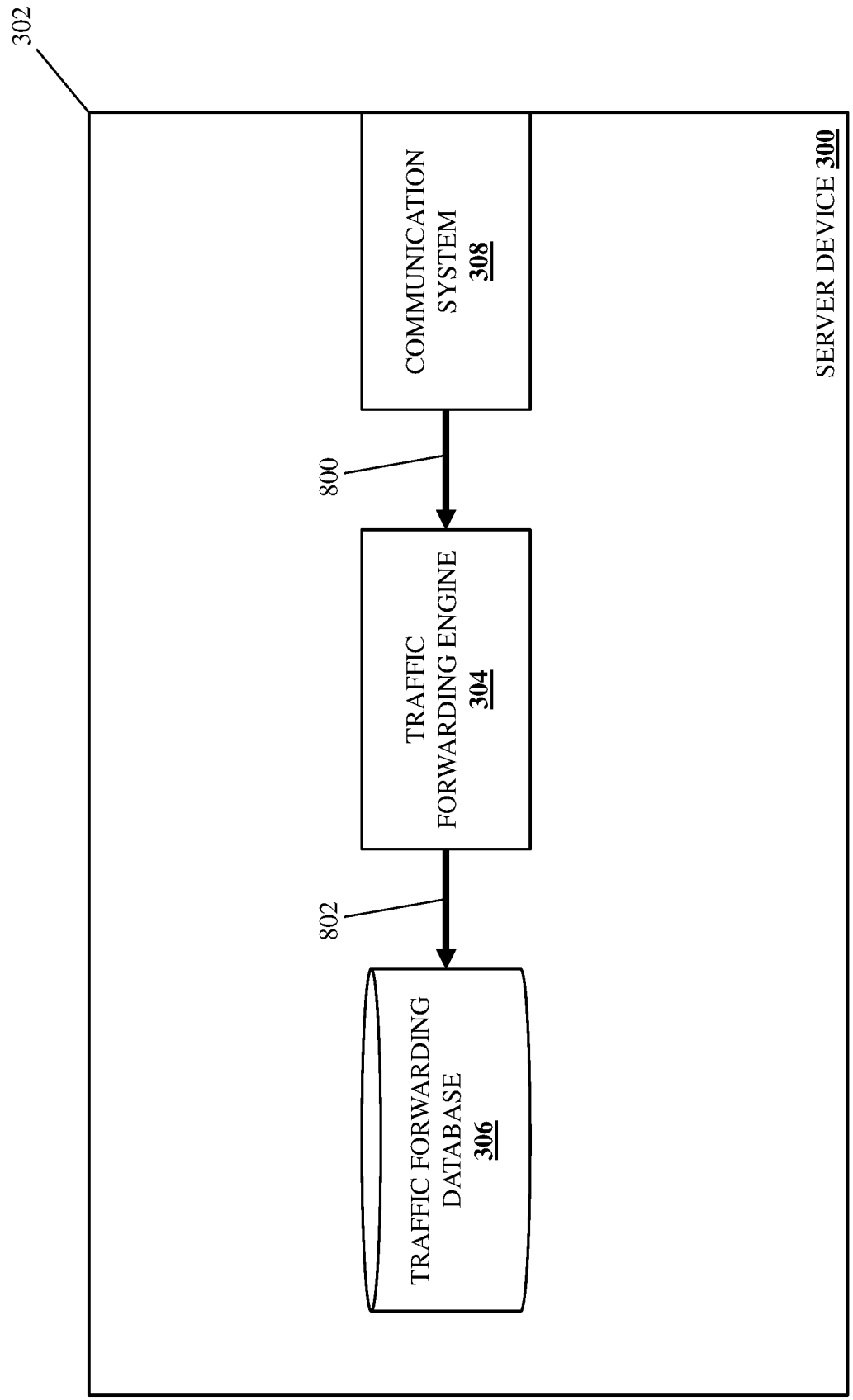

VTEP MULTIPATH DATA TRAFFIC FORWARDING SYSTEM

BACKGROUND

The present disclosure relates generally to information handling systems, and more particularly to forwarding multipath data traffic via Virtual Extensible Local Area Network (VxLAN) Tunnel End Point (VTEP) devices providing information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information Handling Systems sometimes include Virtual Extensible Local Area Network (VxLAN) Tunnel End Point (VTEP) devices for use in transmitting data traffic. For example, an Ethernet Virtual Private Network (EVPN) Virtual extensible Local Area Network (VxLAN) fabric may provide virtual connectivity between Layer 2 (L2)/Layer 3 (L3) domains via a logical overlay network spanning across multiple VTEP devices (e.g., VTEP devices including VTEP subsystem such as virtual bridges in a hypervisor server, VxLAN-specific virtual applications, switching hardware, etc.). As such, the VTEP devices may connect different server devices providing respective virtual machines or other "hosts" known in the art. However, the transmission of data traffic via VTEP devices like those discussed above can raise some issues.

For example, when virtual machines included in a destination L2 domain are connected to different "remote" VTEP devices, type-2 advertisements for the virtual machine "host" Media Access Control (MAC)/Internet Protocol (IP) addresses will be transmitted by the different "remote" VTEP devices to an "ingress" VTEP device. As a result, a type-5 overlay route for reaching a destination subnet for the "remote" VTEP devices will be programmed by the "ingress" VTEP device as an overlay Equal Cost Multi Path (ECMP) route that points to the different "remote" VTEP devices. As will be appreciated by one of skill in the art in possession of the present disclosure, in such a situation, data traffic routed via the overlay ECMP route discussed above may be subject to traffic "tromboning" if the data traffic is transmitted to a "remote" VTEP device that is not directly connected to the virtual machine that is the destination of that data traffic, as that data traffic must then be re-routed by that "remote" VTEP device to the "remote" VTEP device that is directly connected to the virtual machine that is the destination of that data traffic.

Conventional solutions to such issues provide an "exact-match" IP address for each of the virtual machines provided by the server devices discussed above in a Longest Prefix Match (LPM) routing table of the "ingress" VTEP device as non-ECMP routes with a "next-hop" provided by the corresponding "remote" VTEP device that is directly connected to that virtual machine. However, such conventional solutions are non-optimal and do not scale, as they can exhaust the LPM routing table in the "ingress" VTEP device by requiring an entry for each virtual machine accessible via the "ingress" VTEP device.

Accordingly, it would be desirable to provide a VTEP data traffic forwarding system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Virtual Extensible Local Area Network (VxLAN) Tunnel End Point (VTEP) identification/selection engine that is configured to: identify a first virtual machine that is directly coupled to a first VTEP device; associate, in a database, a first VTEP device identifier for the first VTEP device with a first virtual machine identifier for the first virtual machine that is directly coupled to the first VTEP device; identify, to a data traffic provisioning device, the association of the first VTEP device identifier and the first virtual machine identifier, wherein the association of the first VTEP device identifier and the first virtual machine identifier is configured to cause the data traffic provisioning device to provide the first VTEP device identifier in data traffic destined for the first virtual machine; receive, from the data traffic provisioning device, first data traffic including the first VTEP device identifier; and forward, based on the first VTEP device identifier being included in the first data traffic, the first data traffic to the first VTEP device.

BRIEF DESCRIPTION OF THE DRAWINGS

FIG. 8C is a schematic view illustrating an embodiment of the server device of FIG. 3 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
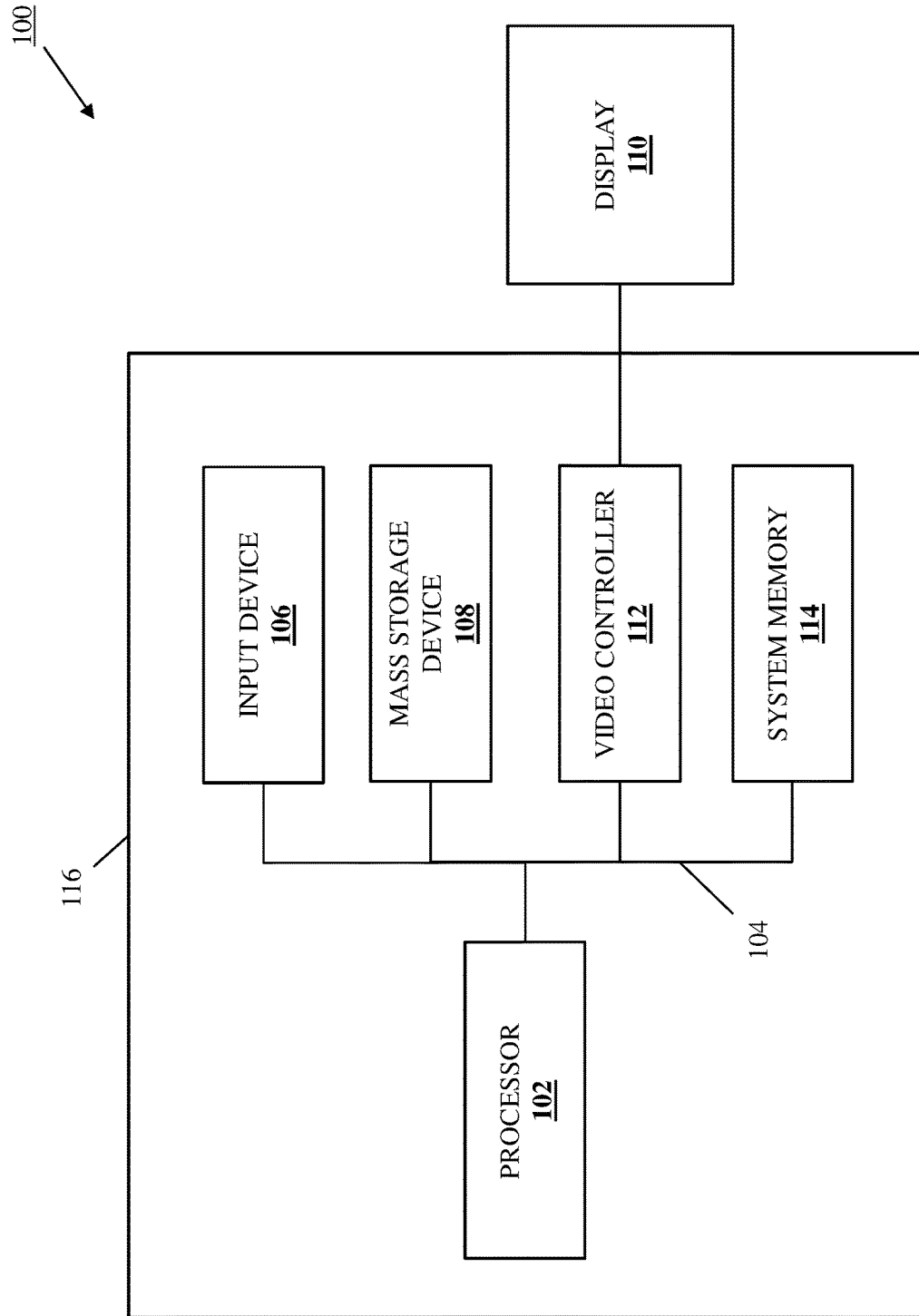
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
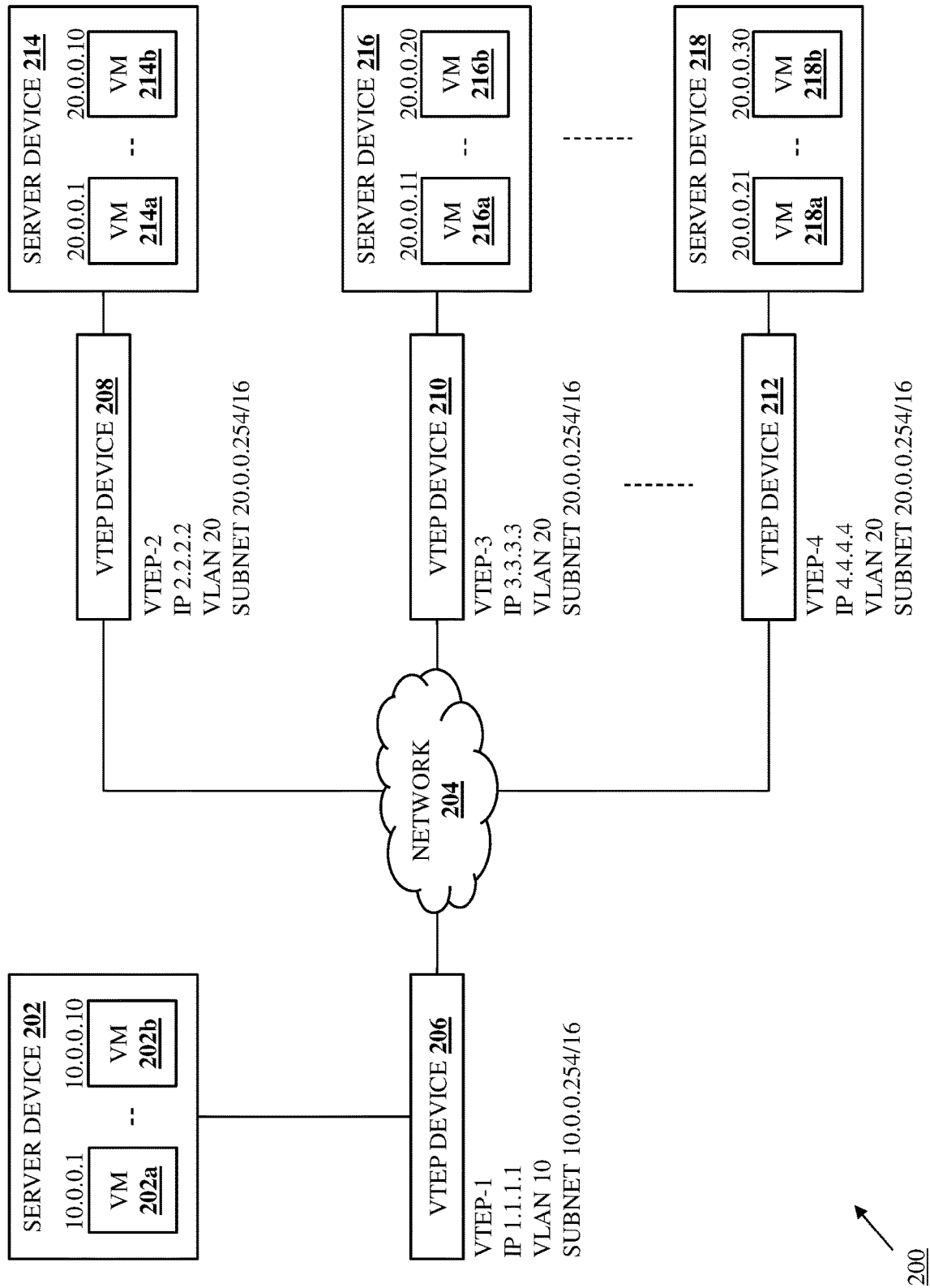
FIG. 2 is a schematic view illustrating an embodiment of a VTEP data traffic forwarding system provided according to the teachings of the present disclosure.

Referring now to FIG. 2, an embodiment of a Virtual Extensible Local Area Network (VxLAN) Tunnel End Point (VTEP) data traffic forwarding system 200 is illustrated. In the illustrated embodiment, the VTEP data traffic forwarding system 200 includes a data traffic provisioning device that, in the illustrated embodiment, is provided by a server device 202. In an embodiment, the server device 202 may be provided by the IHS 100 discussed above with reference to FIG. 1, and/or may include some or all of the components of the IHS 100. However, while illustrated and discussed as being provided by a server device, one of skill in the art in possession of the present disclosure will recognize that data traffic provisioning devices provided in the VTEP data traffic forwarding system 200 may include any devices that may be configured to operate similarly as the server device 202 discussed below. In the illustrated embodiment, the server device 202 has been configured to provide a plurality of virtual machines ("VM"s) 202a and up to 202b. Furthermore, for the purposes of the specific examples provided below, the virtual machine 202a is configured with an Internet Protocol (IP) address "10.0.0.1" and the virtual machine 202b is configured with an IP address "10.0.0.10".

The server device 202 is coupled to a network 204 that, in the specific examples provided herein, is described as providing an Ethernet Virtual Private Network (EVPN) Virtual extensible Local Area Network (VxLAN) fabric, but that one of skill in the art in possession of the present disclosure will appreciate may provide other fabrics while remaining within the scope of the present disclosure as well. In the illustrated embodiment, a VTEP device 206 provides a portion of the network 204 that is coupled to the server device 202. In an embodiment, the VTEP device 206 may be provided by the IHS 100 discussed above with reference to FIG. 1, and/or may include some or all of the components of the IHS 100, and in specific examples may be provided by a virtual bridge in a hypervisor server, a VxLAN-specific virtual application, networking/switching hardware, and/or other VTEP subsystems that would be apparent to one of skill in the art in possession of the present disclosure. However, while illustrated and discussed as being provided by particular VTEP devices/subsystems, one of skill in the art in possession of the present disclosure will recognize that VTEP devices provided in the VTEP data traffic forwarding system 200 may include any devices that may be configured to operate similarly as the VTEP device 206 discussed below. For the purposes of the specific examples provided below, the VTEP device 206 is denoted as "VTEP-1" and is configured with an IP address "1.1.1.1", a VLAN 10, and a subnet "10.0.0.254/16".

In the illustrated embodiment, a plurality of VTEP devices 208, 210, and up to 212 provide a portion of the network 204. Similarly as discussed above, each of the VTEP devices 208-212 may be provided by the IHS 100 discussed above with reference to FIG. 1, and/or may include some or all of the components of the IHS 100, and in specific examples may be provided by a virtual bridge in a hypervisor server, a VxLAN-specific virtual application, networking/switching hardware, and/or other VTEP subsystems that would be apparent to one of skill in the art in possession of the present disclosure. However, while illustrated and discussed as being provided by particular VTEP devices/subsystems, one of skill in the art in possession of the present disclosure will recognize that VTEP devices provided in the VTEP data traffic forwarding system 200 may include any devices that may be configured to operate similarly as the VTEP devices 208-212 discussed below. For the purposes of the specific examples provided below, the VTEP device 208 is denoted as "VTEP-2" and is configured with an IP address "2.2.2.2", a VLAN 20, and a subnet "20.0.0.254/16"; the VTEP device 210 is denoted as "VTEP-3" and is configured with an IP address "3.3.3.3", the VLAN 20, and the subnet "20.0.0.254/16"; and the VTEP device 212 is denoted as "VTEP-4" and is configured with an IP address "4.4.4.4", the VLAN 20, and the subnet "20.0.0.254/16". Furthermore, while the VTEP devices 206-211 are illustrated and described as providing the network 204, one of skill in the art in possession of the present disclosure will appreciate how the network 204 may be provided by other devices while remaining within the scope of the present disclosure as well.

In the illustrated embodiment, a server device 214 is directly coupled to the VTEP device 208. In an embodiment, the server device 214 may be provided by the IHS 100 discussed above with reference to FIG. 1, and/or may include some or all of the components of the IHS 100. However, while illustrated and described as being provided by a server device, one of skill in the art in possession of the present disclosure will appreciate how other devices may provide the virtual machines and/or other hosts discussed below while remaining within the scope of the present disclosure as well. In the illustrated embodiment, the server device 214 has been configured to provide a plurality of virtual machines ("VM"s) 214a and up to 214b. Furthermore, for the purposes of the specific examples provided below, the virtual machine 214a is configured with an IP address "20.0.0.1", and the virtual machine 214b is configured with an IP address "20.0.0.10".

In the illustrated embodiment, a server device 216 is directly coupled to the VTEP device 210. In an embodiment, the server device 216 may be provided by the IHS 100 discussed above with reference to FIG. 1, and/or may include some or all of the components of the IHS 100. However, while illustrated and described as being provided by a server device, one of skill in the art in possession of the present disclosure will appreciate how other devices may provide the virtual machines and/or other hosts discussed below while remaining within the scope of the present disclosure as well. In the illustrated embodiment, the server device 216 has been configured to provide a plurality of virtual machines ("VM"s) 216a and up to 216b. Furthermore, for the purposes of the specific examples provided below, the virtual machine 216a is configured with an IP address "20.0.0.11", and the virtual machine 216b is configured with an IP address "20.0.0.20".

In the illustrated embodiment, a server device 218 is directly coupled to the VTEP device 212. In an embodiment, the server device 218 may be provided by the IHS 100 discussed above with reference to FIG. 1, and/or may include some or all of the components of the IHS 100. However, while illustrated and described as being provided by a server device, one of skill in the art in possession of the present disclosure will appreciate how other devices may provide the virtual machines and/or other hosts discussed below while remaining within the scope of the present disclosure as well. In the illustrated embodiment, the server device 218 has been configured to provide a plurality of virtual machines ("VM"s) 218a and up to 218b. Furthermore, for the purposes of the specific examples provided below, the virtual machine 218a is configured with an IP address "20.0.0.21", and the virtual machine 218b is configured with an IP address "20.0.0.30". Furthermore, while a specific VTEP data traffic forwarding system 200 has been illustrated and described, one of skill in the art in possession of the present disclosure will recognize that the VTEP data traffic forwarding system of the present disclosure may include a variety of components and component configurations while remaining within the scope of the present disclosure as well.

Figure 3:
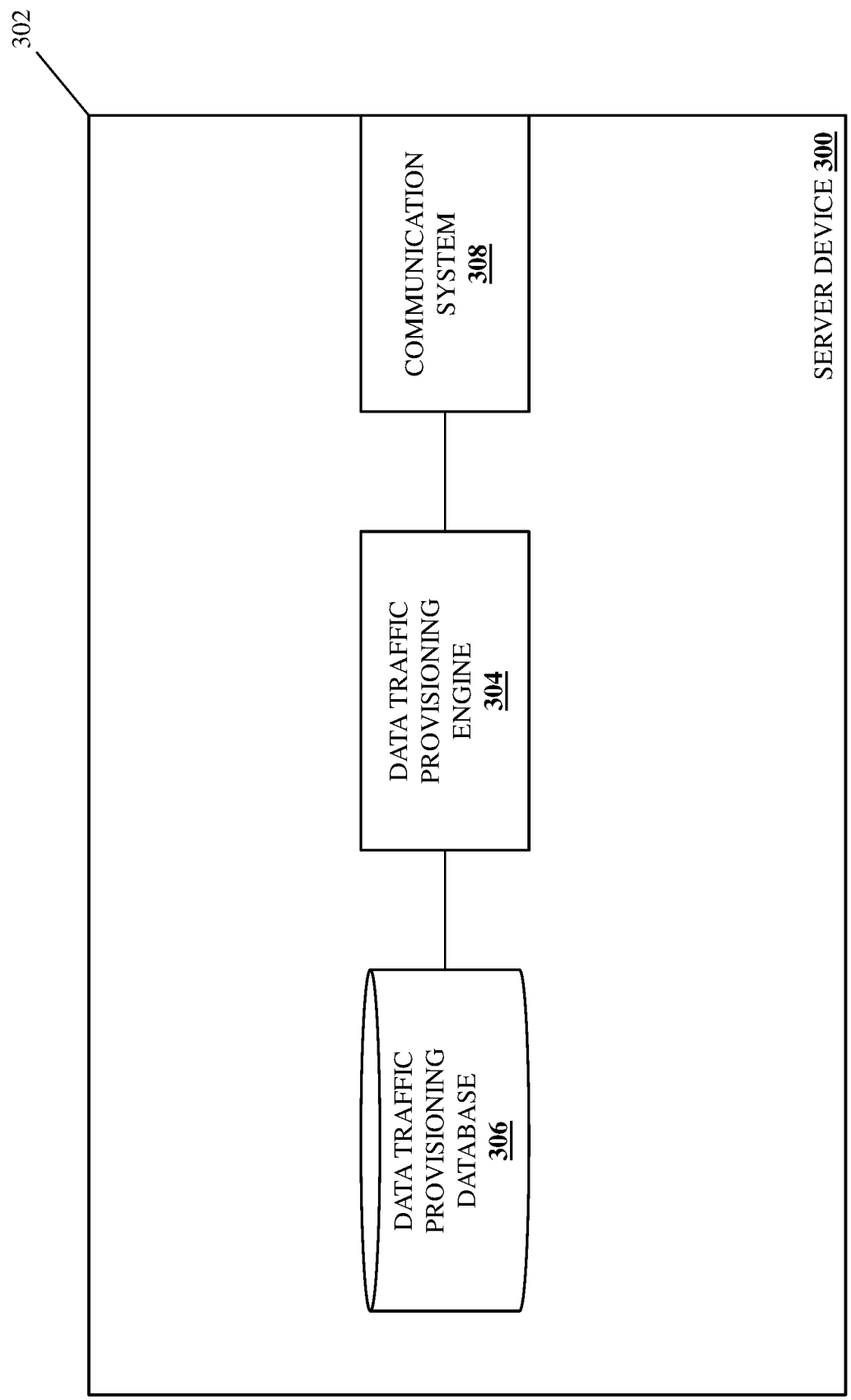
FIG. 3 is a schematic view illustrating an embodiment of a server device that may be included in the VTEP data traffic forwarding system of FIG. 2.

Referring now to FIG. 3, an embodiment of a server device 300 is illustrated that may provide the server device 202 discussed above with reference to FIG. 2. As such, the server device 300 may be provided by the IHS 100 discussed above with reference to FIG. 1 and/or may include some or all of the components of the IHS 100. Furthermore, while illustrated and discussed as being provided by a server device, one of skill in the art in possession of the present disclosure will recognize that the functionality of the server device 300 discussed below may be provided by other devices that are configured to operate similarly as the server device 300 discussed below. In the illustrated embodiment, the server device 300 includes a chassis 302 that houses the components of the server device 300, only some of which are illustrated and described below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a data traffic provisioning engine 304 that is configured to perform the functionality of the data traffic provisioning engines and/or server devices discussed below.

The chassis 302 may also house a storage system (not illustrated, but which may include the storage 108 discussed above with reference to FIG. 1) that is coupled to the data traffic provisioning engine 304 (e.g., via a coupling between the storage system and the processing system) and that includes a data traffic provisioning database 306 that is configured to store any of the information utilized by the data traffic provisioning engine 304 discussed below. The chassis 302 may also house a communication system 308 that is coupled to the data traffic provisioning engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

In a specific example, the data traffic provisioning functionality of the server device 300 may be provided by a Smart Network Interface Controller (SmartNIC) device that may be provided by the processing system, memory system, storage system, and communication system 308 (as well as other SmartNIC components that would be apparent to one of skill in the art in possession of the present disclosure). As such, in addition to server components, the server device 300 may include a SmartNIC device that is configured to perform the functionality of the data traffic provisioning engine 304 discussed below. In another specific example, the functionality of the data traffic provisioning engine 304 may be provided by a Data Processing Unit (DPU) in the server device 300. However, while a specific server device and specific examples of the implementation of data traffic provisioning subsystems have been illustrated and described, one of skill in the art in possession of the present disclosure will recognize that data traffic provisioning devices (or other devices operating according to the teachings of the present disclosure in a manner similar to that described below for the server device 300) may include a variety of components and/or component configurations for providing conventional server device functionality, as well as the functionality discussed below, while remaining within the scope of the present disclosure as well.

Figure 4:
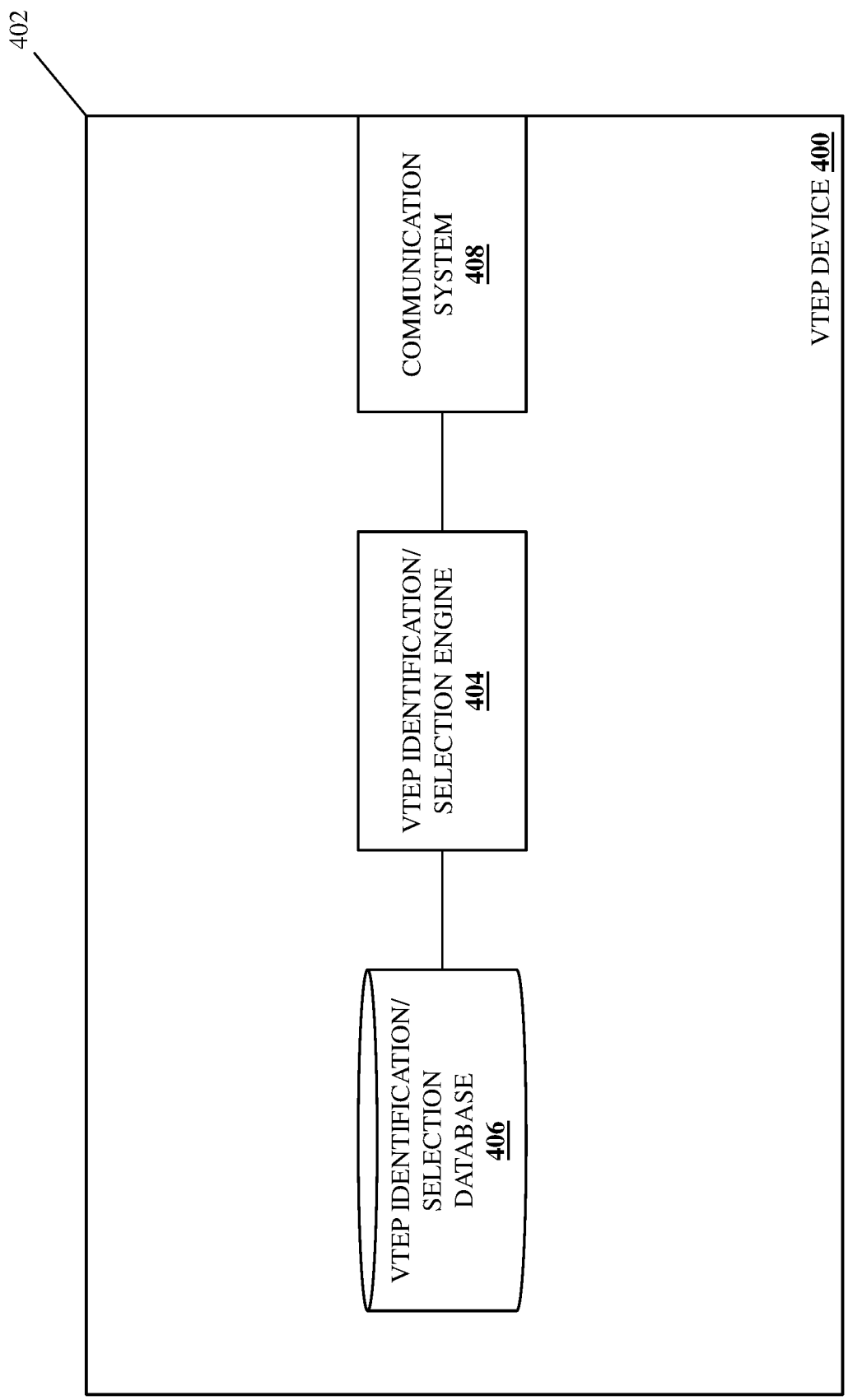
FIG. 4 is a schematic view illustrating an embodiment of a VTEP device that may be included in the VTEP data traffic forwarding system of FIG. 2.

Referring now to FIG. 4, an embodiment of a VTEP device 400 is illustrated that may provide any or each of the VTEP devices 206, 208, 210, and/or 212 discussed above with reference to FIG. 2. As such, the VTEP device 400 may be provided by the IHS 100 discussed above with reference to FIG. 1 and/or may include some or all of the components of the IHS 100, and in specific examples may be provided by a virtual bridge in a hypervisor server, a VxLAN-specific virtual application, networking/switching hardware, and/or other VTEP subsystems that would be apparent to one of skill in the art in possession of the present disclosure. However, while illustrated and discussed as being provided by particular VTEP devices/subsystems, one of skill in the art in possession of the present disclosure will recognize that the VTEP device 400 may be provided by any devices that may be configured to operate similarly as the VTEP device 400 discussed below. In the illustrated embodiment, the VTEP device 400 includes a chassis 402 that houses the components of the VTEP device 400, only some of which are illustrated and discussed below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a VTEP identification/selection engine 404 that is configured to perform the functionality of the VTEP identification/selections engines and/or VTEP devices discussed below.

The chassis 402 may also house a storage system (not illustrated, but which may include the storage 108 discussed above with reference to FIG. 1) that is coupled to the VTEP identification/selection engine 404 (e.g., via a coupling between the storage system and the processing system) and that includes a VTEP identification/selection database 406 that is configured to store any of the information utilized by VTEP identification/selection engine 404 discussed below. The chassis 402 may also house a communication system 408 that is coupled to the VTEP identification/selection engine 404 (e.g., via a coupling between the communication system 408 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific VTEP device 400 has been illustrated and described, one of skill in the art in possession of the present disclosure will recognize that VTEP devices (or other devices operating according to the teachings of the present disclosure in a manner similar to that described below for the VTEP device 400) may include a variety of components and/or component configurations for providing conventional VTEP device functionality, as well as the functionality discussed below, while remaining within the scope of the present disclosure as well.

Figure 5:
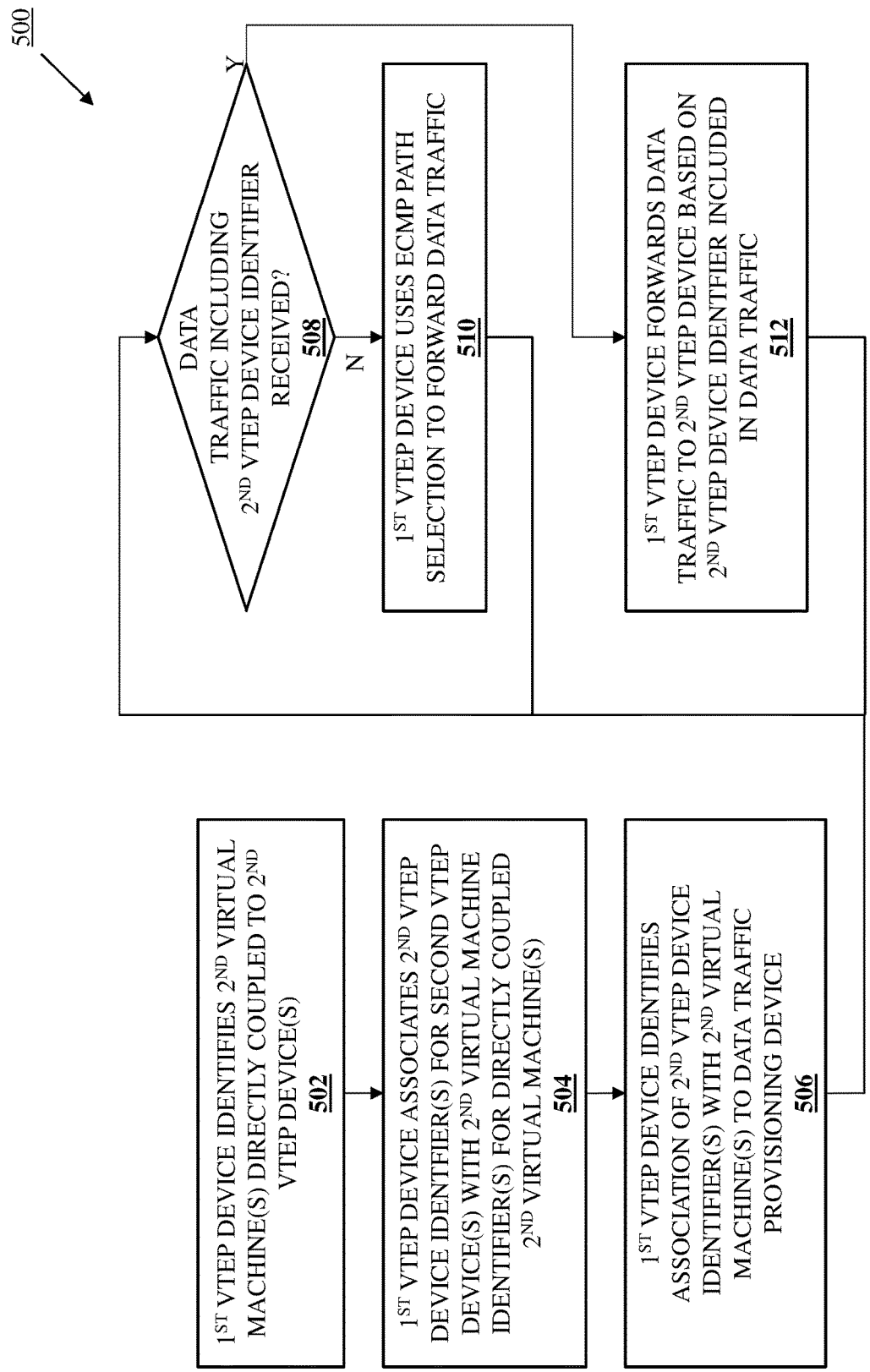
FIG. 5 is a flow chart illustrating an embodiment of a method for forwarding data traffic via a VTEP device.

Referring now to FIG. 5, an embodiment of a method 500 for forwarding data traffic via a Virtual Extensible Local Area Network (VxLAN) Tunnel End Point (VTEP) device is illustrated. As discussed below, the systems and methods of the present disclosure provide for the identification to a data provisioning device of virtual machines that are directly coupled to VTEP devices, allowing the data provisioning device to identify the VTEP device through which data traffic should be forwarded in order to efficiently reach any of the virtual machines. For example, the VTEP data traffic forwarding system of the present disclosure may include a second VTEP device coupled to a data traffic provisioning device and a first VTEP device. The second VTEP device identifies a virtual machine directly coupled to the first VTEP device, associates a first VTEP device identifier for the first VTEP device in a database with a virtual machine identifier for the virtual machine, and identifies the association of the first VTEP device identifier and the virtual machine identifier to the data traffic provisioning device, with the association of the first VTEP device identifier and the virtual machine identifier causing the data traffic provisioning device to provide the first VTEP device identifier in data traffic destined for the virtual machine. The second VTEP device then receives data traffic including the first VTEP device identifier from the data traffic provisioning device and, in response, forwards the data traffic to the first VTEP device. As such, traffic tromboning that may occur in conventional VTEP data traffic forwarding systems is prevented without exhausting a routing table in the VTEP device forwarding data traffic.

Figure 6A:
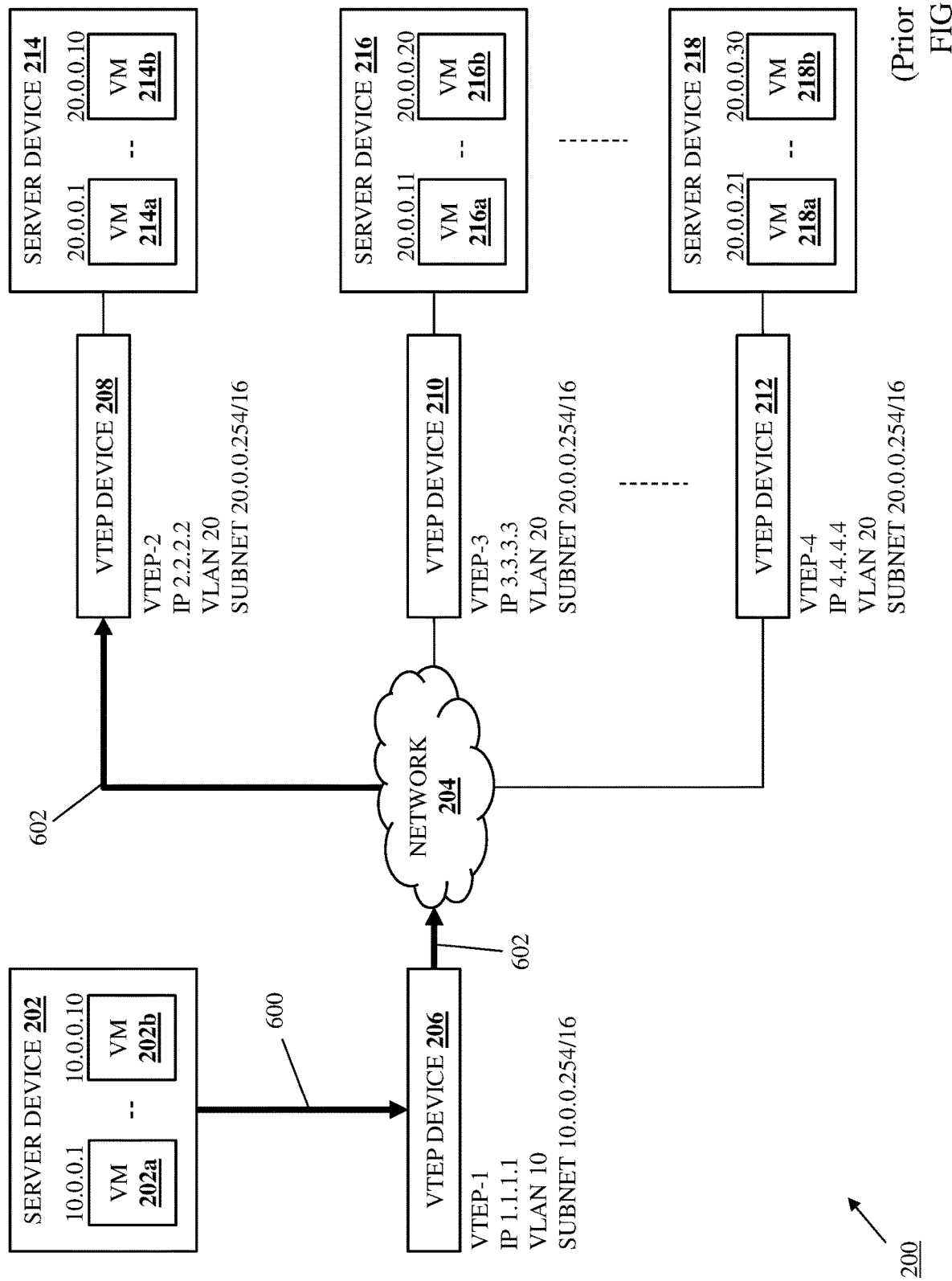
FIG. 6A is a schematic view illustrating an embodiment of conventional VTEP data traffic forwarding operations using the VTEP data traffic forwarding system of FIG. 2.
Figure 6B:
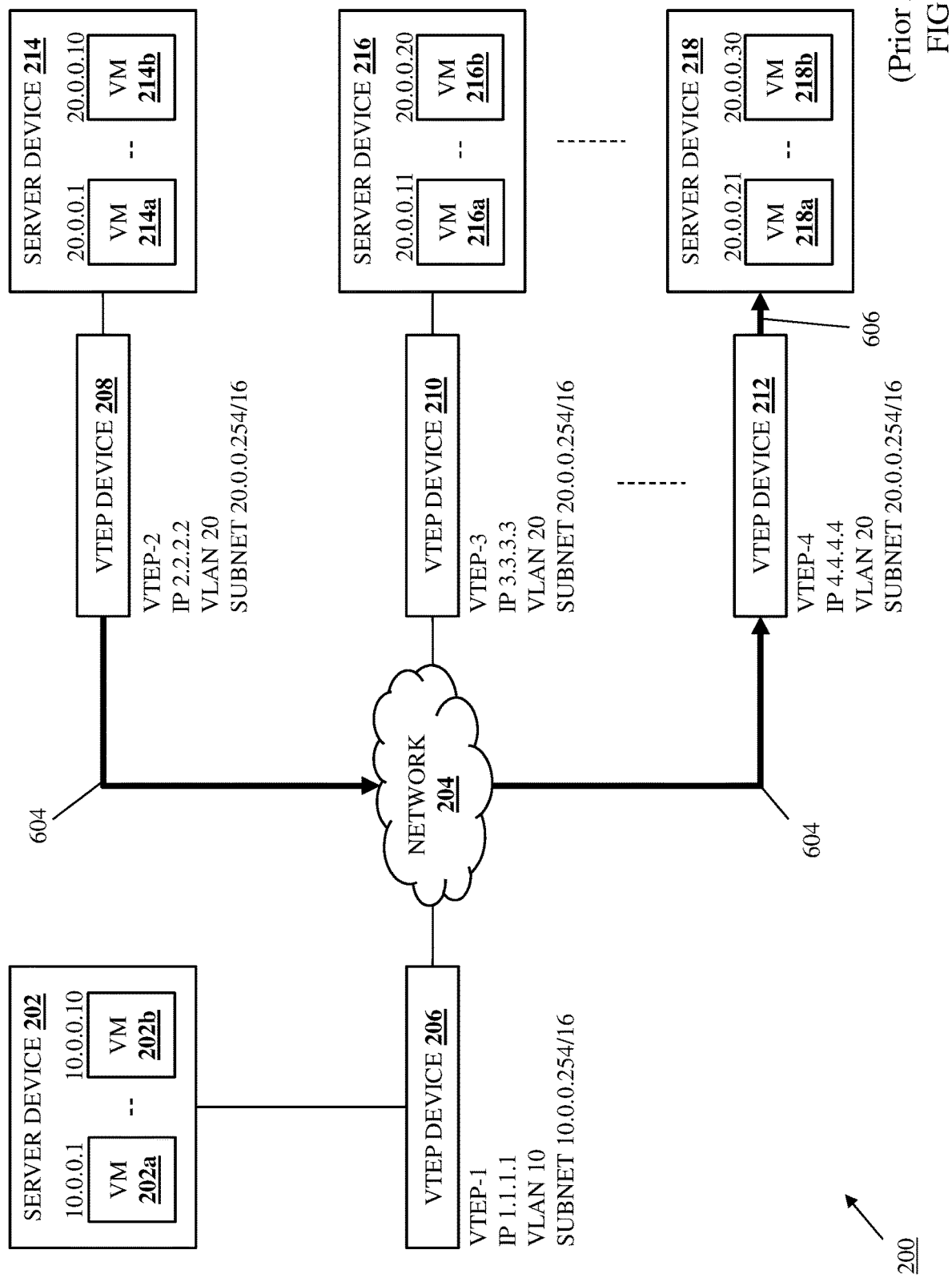
FIG. 6B is a schematic view illustrating an embodiment of conventional VTEP data traffic forwarding operations using the VTEP data traffic forwarding system of FIG. 2.

Referring now to FIGS. 6A and 6B, and embodiment of conventional VTEP data traffic forwarding operations using the VTEP data traffic forwarding system of FIG. 2 is illustrated and described for the purposes of comparison to the VTEP data traffic forwarding operations of the present disclosure. As can be seen in FIG. 6A, the server device 202 may perform data traffic provisioning operations 600 that may include transmitting data traffic to the VTEP device 206 for forwarding to one of the virtual machines 214a-214b, 216a-216b, and 218a-218b in the server devices 214, 216, and 218, respectively, with the specific example described below including the virtual machine 202a in the server device 202 providing data traffic to the VTEP device 206 for forwarding to the virtual machine 218b in the server device 218.

As discussed above, with the virtual machines 214a-214b, 216a-216b, and 218a-218b included in a destination L2 domain connected to the VTEP devices 208, 210, and 212, type-2 advertisements for the virtual machine "host" Media Access Control (MAC)/Internet Protocol (IP) addresses will be transmitted by the VTEP devices 208, 210, and 212 to the VTEP device 206. As a result, a type-5 overlay route for reaching a destination subnet for the VTEP devices 208, 210, and 212 will be programmed by the VTEP device 206 as an overlay Equal Cost Multi Path (ECMP) route that points to the VTEP devices 208, 210, and 212. As such, ECMP selection operations by the VTEP device 206 may result in the selection of the VTEP device 208 for forwarding the data traffic, followed by the VTEP device 206 performing data traffic forwarding operations 602 that forward the data traffic via the network 204 to the VTEP device 208.

In response to receiving the data traffic, the VTEP device 208 may perform decapsulation operations on the data traffic in order to determine that the data traffic is destined for the virtual machine 218b that is included in the server device 218 that is not directly coupled to the VTEP device 208. With reference to FIG. 6B, in response to determining that the data traffic is destined for the virtual machine 218b that is included in the server device 218 that is not directly coupled to the VTEP device 208, the VTEP device 208 may perform encapsulation operations to re-encapsulate the data traffic, followed by data traffic forwarding operations 604 that forward the data traffic via the network 204 to the VTEP device 212. The VTEP device 212 may then perform decapsulation operations on the data traffic in order to determine that the data traffic is destined for the virtual machine 218b that is included in the server device 218 that is directly coupled to the VTEP device 208, followed by data traffic forwarding operations 606 that forward the data traffic to the virtual machine 218b in the server device 218.

As will be appreciated by one of skill in the art in possession of the present disclosure, the routing of the data traffic in the manner described above (i.e., from the VTEP device 206 through the network 204 to the VTEP device 208, and then from the VTEP device 208 and through the network 204 to the VTEP device 212) is referred to as traffic "tromboning", and adds to latency in the transmission of data traffic, as well as other issues that would be apparent to one of skill in the art in possession of the present disclosure. As also discussed above, conventional solutions to such issues provide an "exact-match" IP address for each of the virtual machines provided by the server devices 214, 216, and 218 discussed above in a Longest Prefix Match (LPM) routing table of the VTEP device 206 as non-ECMP routes with a "next-hop" provided by the corresponding VTEP device 208, 210, or 212 that is directly connected to that virtual machine. However, such conventional solutions are non-optimal and do not scale, as they can exhaust the LPM routing table in the VTEP device 206 by requiring an entry for each virtual machine accessible via the VTEP device 206 (which can number in the hundreds, thousands, or more). As discussed below, the systems and methods of the present disclosure operate to prevent such traffic tromboning without exhausting the LPM routing table in the VTEP device 206.

Figure 7A:
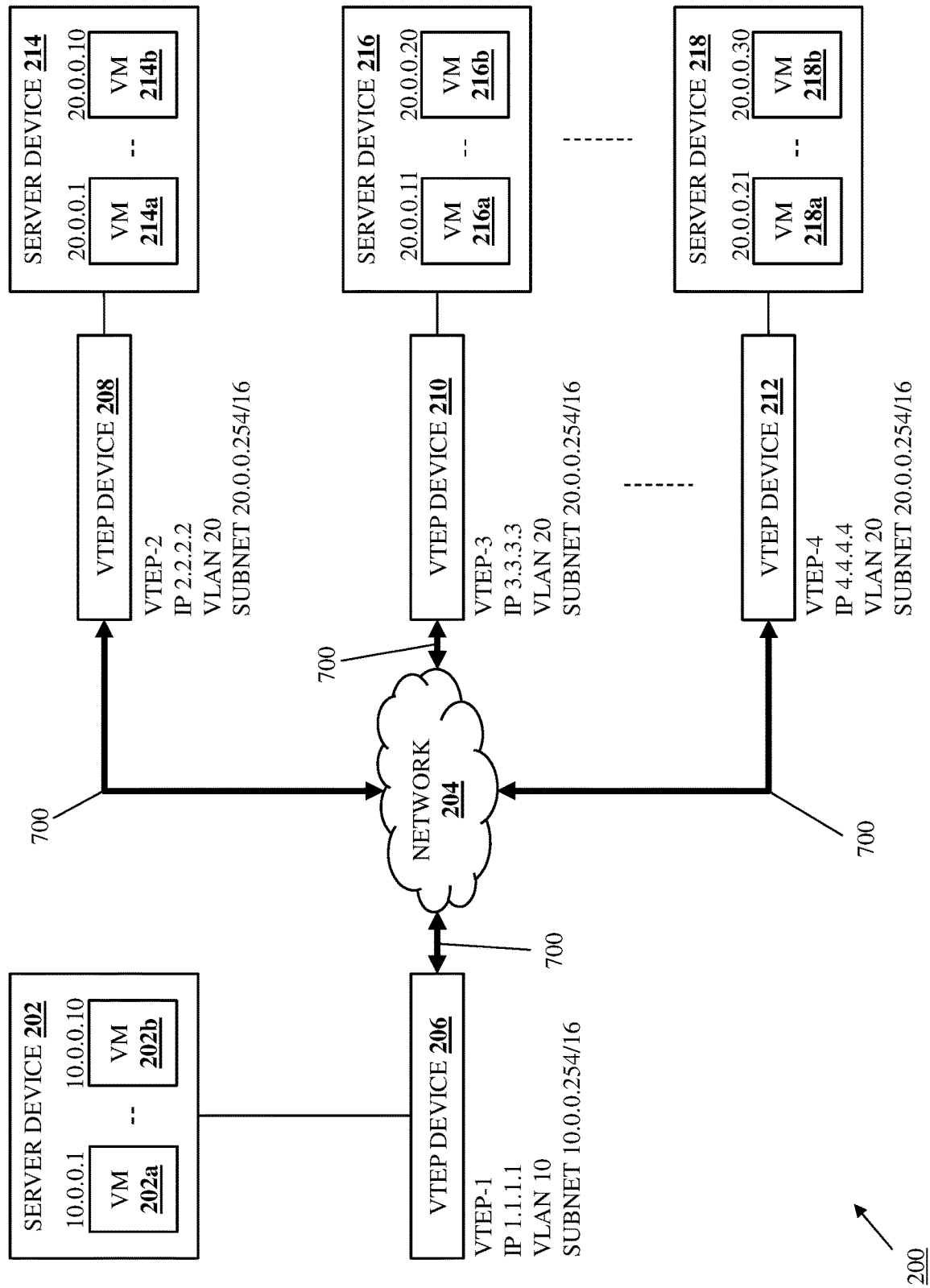
FIG. 7A is a schematic view illustrating an embodiment of the VTEP data traffic forwarding system of FIG. 2 operating during the method of FIG. 5.

The method 500 begins at block 502 where a first VTEP device identifies virtual machine(s) that are directly coupled to second VTEP device(s). With reference to FIG. 7A, in an embodiment of block 502, the VTEP devices 206, 208, 210, and 212 may perform VTEP discovery operations 700 via the network 204 in order to discover each other. For example, the VTEP discovery operations performed by each of the VTEP devices 206, 208, 210, and 212 may be performed according to the Border Gateway Protocol (BGP), although other VTEP discovery operations will fall within the scope of the present disclosure as well. As part of the VTEP discovery operations 700, the VTEP device 206 may assign unique identifiers to each of the VTEP devices 208, 210, and 212 (e.g., "VTEP-2", "VTEP-3", and "VTEP-4", respectively, in the specific examples provided below).

Figure 7B:
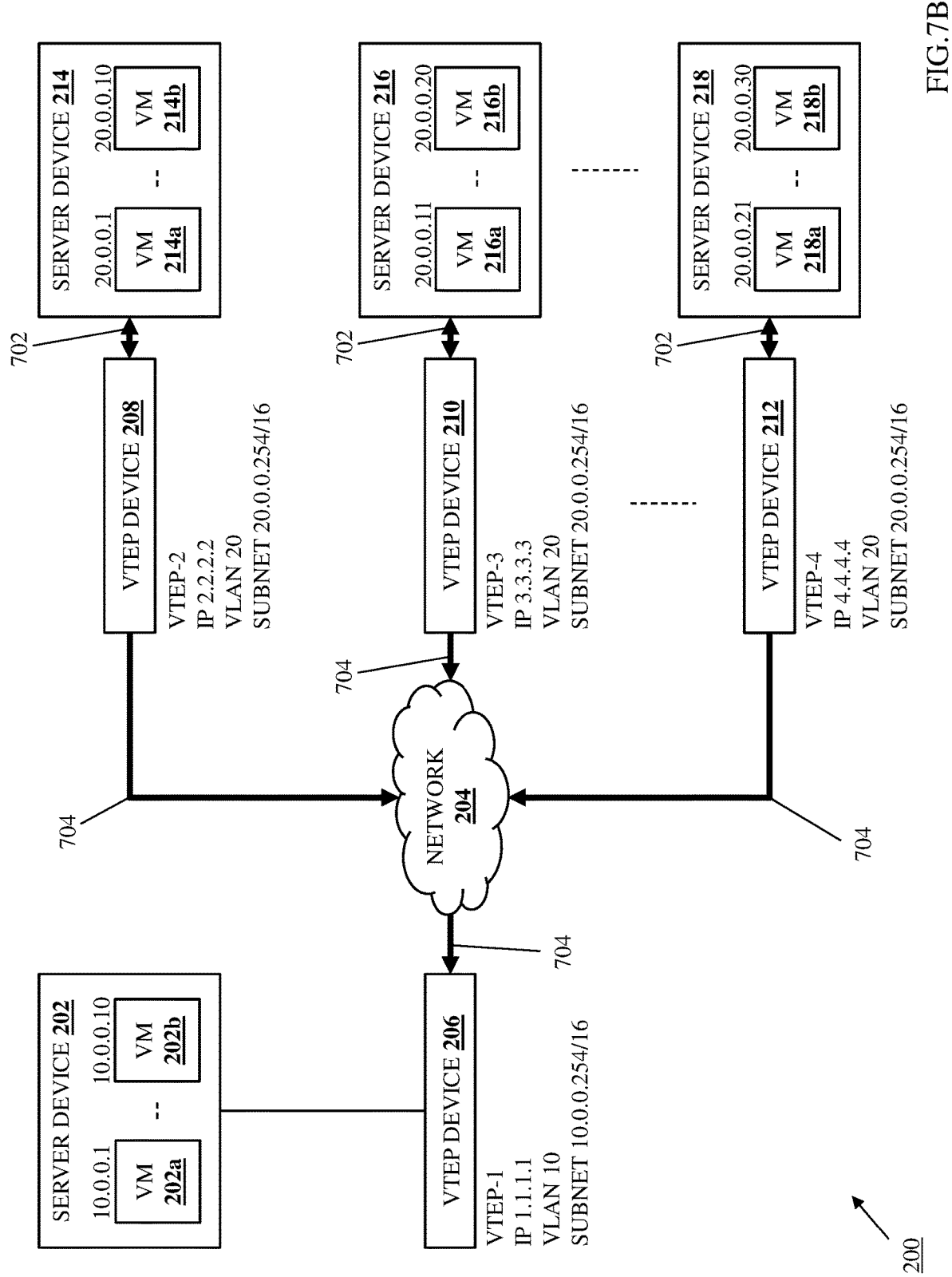
FIG. 7B is a schematic view illustrating an embodiment of the VTEP data traffic forwarding system of FIG. 2 operating during the method of FIG. 5.

With reference to FIG. 7B, in an embodiment of block 502 and following the VTEP discovery operations 700, the VTEP devices 206, 208, 210, and 212 may perform virtual machine discovery operations 702 in order to discover each of their directly coupled virtual machines 214a-214b, 216a-216b, and 218a-218b, respectively. As will be appreciated by one of skill in the art in possession of the present disclosure the "direct coupling" of virtual machines to VTEP devices described herein refers to virtual machines that are directly accessible via their "directly coupled" VTEP device, with the VTEP device 208 "directly coupled" to the virtual machines 214a-214b in the server device 214, the VTEP device 210 "directly coupled" to the virtual machines 216a-216b in the server device 216, and the VTEP device 212 "directly coupled" to the virtual machines 218a-218b in the server device 218. As such, one of skill in the art in possession of the present disclosure will appreciate how the virtual machines of the present disclosure may be directly coupled to a VTEP device even when other devices are coupled between the virtual machines and that "directly coupled" VTEP device.

Figure 7C:
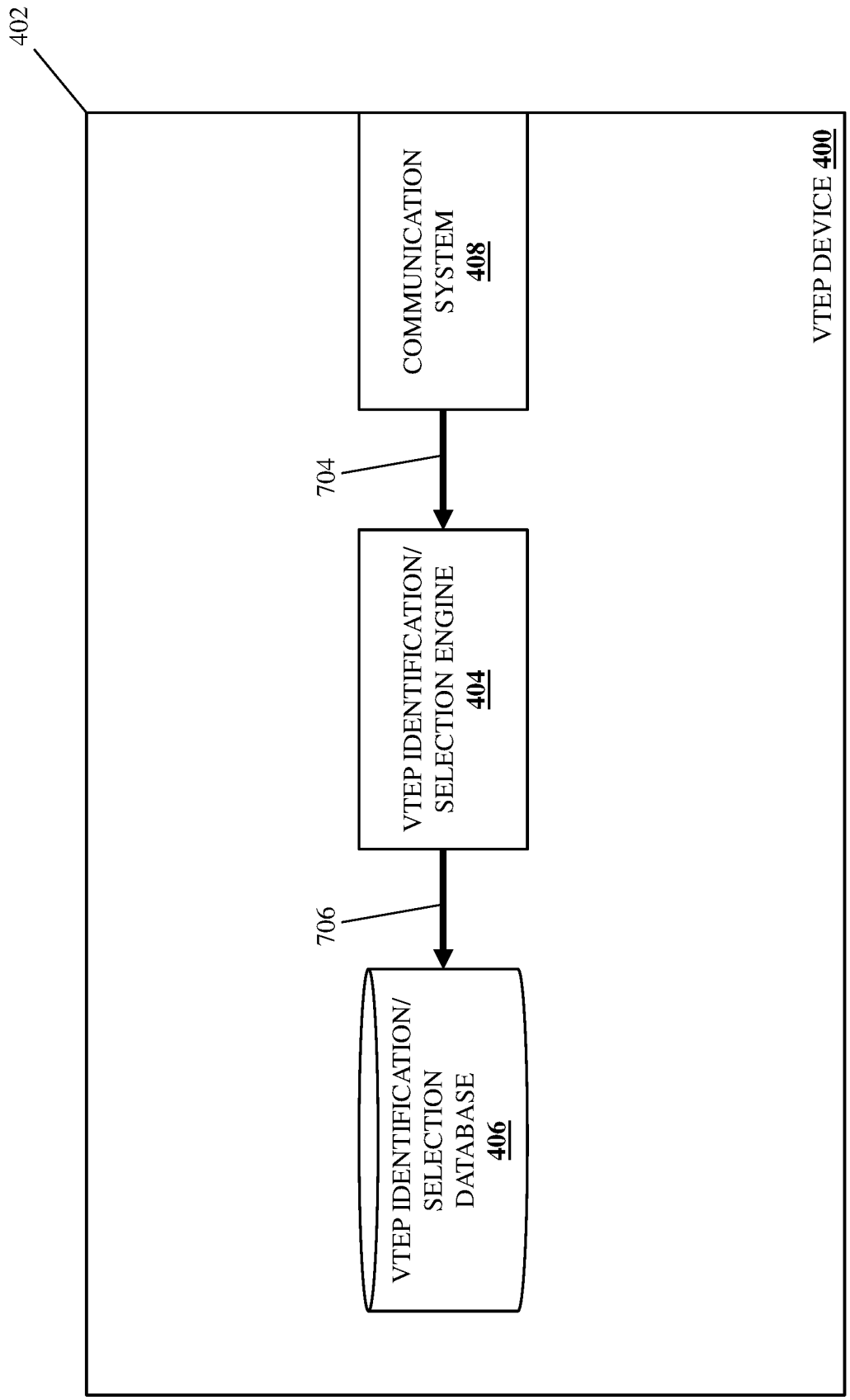
FIG. 7C is a schematic view illustrating an embodiment of the VTEP device of FIG. 4 operating during the method of FIG. 5.

Following the virtual machine discovery operations 702, the VTEP devices 208, 210, and 212 may perform virtual machine advertisement operations 704 in order to advertise the virtual machines they discovered during the virtual machine discovery operations 702 to the VTEP device 206. As such, in the illustrated embodiment, the VTEP device 208 may advertise the virtual machines 214a-214b in the server device 214 to the VTEP device 206, the VTEP device 210 may advertise the virtual machines 216a-216b in the server device 216 to the VTEP device 206, and the VTEP device 212 may advertise the virtual machines 218a-218b in the server device 218 to the VTEP device 206. In a specific example that one of skill in the art in possession of the present disclosure will recognize as involving the BGP discussed above, each of the VTEP devices 208, 210, and 212 may advertise virtual machine identifiers for their directly coupled virtual machines via type-2 MAC/IP routes and the virtual machine subnet for their directly coupled virtual machines via type-5 prefix routes. With reference to FIG. 7C, the VTEP identification/section engine 404 in the VTEP device 206/400 may receive the advertisements provided as part of the virtual machine advertisement operations 704 via its communication system 408 and, in response, identify that the virtual machines 214a-214b in the server device 214 are directly coupled to the VTEP device 208, the virtual machines 216a-216b in the server device 216 are directly coupled to the VTEP device 210, and the virtual machines 218a-218b in the server device 218 are directly coupled to the VTEP device 212.

The method 500 then proceeds to block 504 where the first VTEP device associates second VTEP device identifier(s) for the second VTEP device(s) with second virtual machines identifier(s) for directly coupled second virtual machine(s). With continued reference to FIG. 7C, in an embodiment of block 504, the VTEP identification/selection engine 404 in the VTEP device 206/400 may perform VTEP identifier/virtual machine identifier association operations 706 that may include associating VTEP device identifiers for the VTEP devices 208, 210, and 212 with virtual machine identifiers for their directly coupled virtual machines. For example, the VTEP identifier/virtual machine identifier association operations 706 may include the VTEP identification/selection engine 404 associating the VTEP device identifier "VTEP-2" for the VTEP device 208 with the virtual machine identifier "20.0.0.1" for the virtual machine 214a and the virtual machine identifier "20.0.0.10" for the virtual machine 214*b*, associating the VTEP device identifier "VTEP-3" for the VTEP device 210 with the virtual machine identifier "20.0.0.11" for the virtual machine 216*a* and the virtual machine identifier "20.0.0.20" for the virtual machine 216*b*, and associating the VTEP device identifier "VTEP-4" for the VTEP device 212 with the virtual machine identifier "20.0.0.21" for the virtual machine 218*a* and the virtual machine identifier "20.0.0.30" for the virtual machine 218*b*. However, while the use of IP addresses for the virtual machine identifiers has been described, one of skill in the art in possession of the present disclosure will appreciate how other virtual machine identifiers will fall within the scope of the present disclosure as well.

Figure 8A:
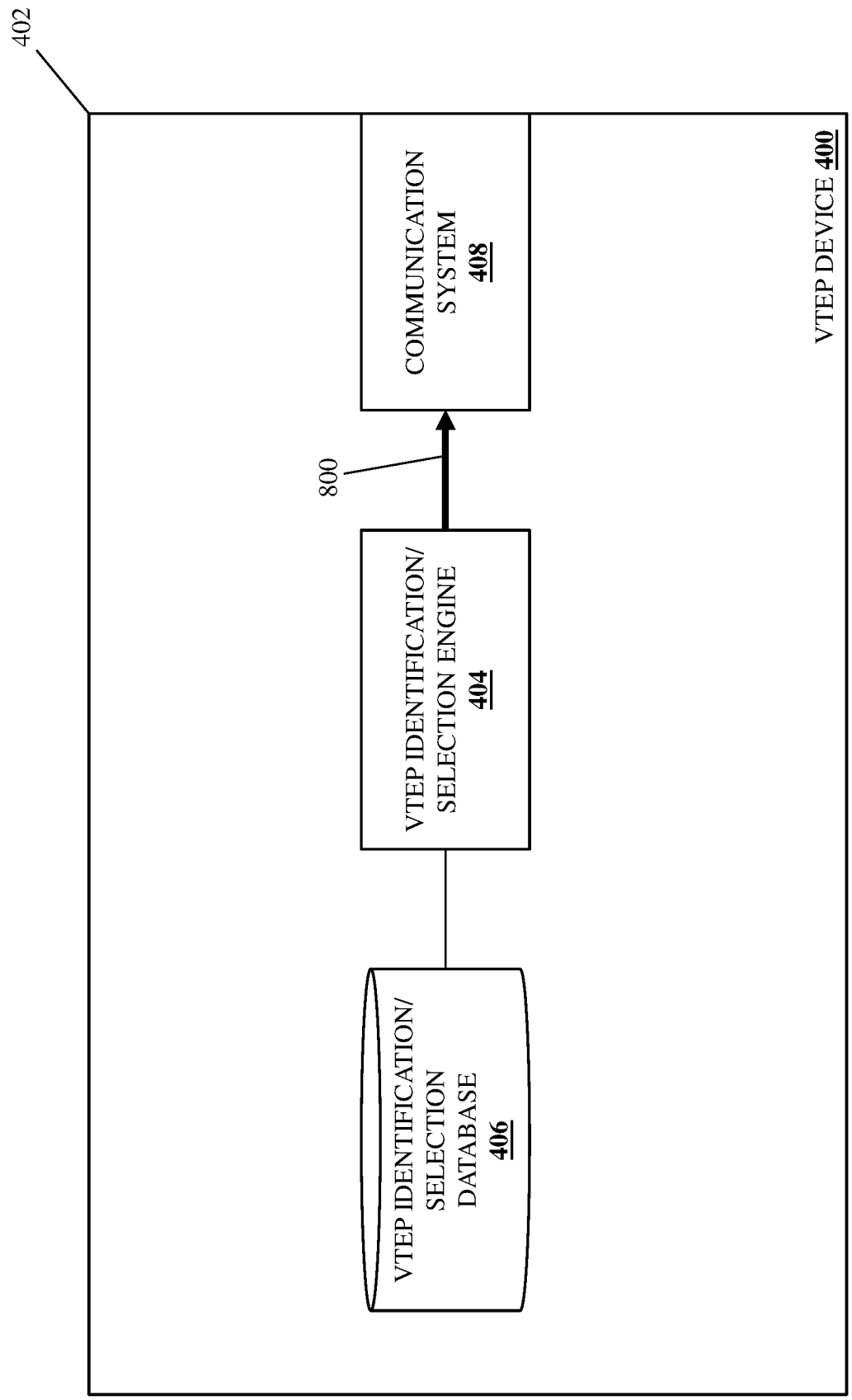
FIG. 8A is a schematic view illustrating an embodiment of the VTEP device of FIG. 4 operating during the method of FIG. 5.
Figure 8B:
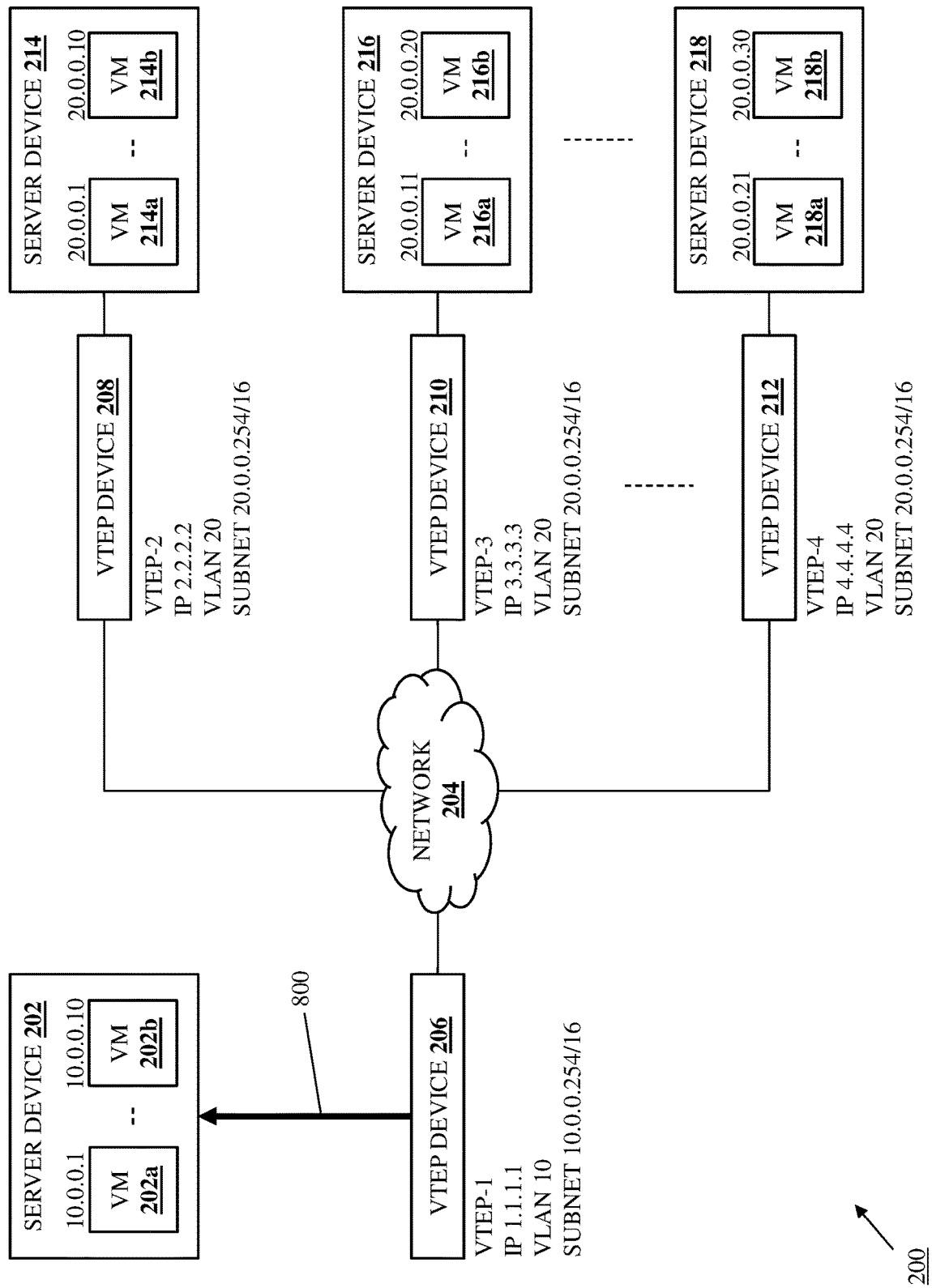
FIG. 8B is a schematic view illustrating an embodiment of the VTEP data traffic forwarding system of FIG. 2 operating during the method of FIG. 5.

Continuing with the specific example discussed above that one of skill in the art in possession of the present disclosure will recognize as involving the BGP, the association of the VTEP device identifiers and the virtual machine identifiers may include identifying whether a type-5 prefix route advertised by a VTEP device is an ECMP route. In the event a type-5 prefix route advertised by a VTEP device is not an ECMP route, the VTEP identification/selection engine 404 in the VTEP device 206/400 may program the type-5 prefix route in the VTEP identification-selection database 406 with a next hop object. In the event a type-5 prefix route advertised by a VTEP device is an ECMP route, the VTEP identification/selection engine 404 may program a level-1 ECMP table in the VTEP identification/selection database 406 with the VTEP device identifier, program the VTEP device for that VTEP identifier as level-2 next hop object in the VTEP identification-selection database 406, and program the type-5 prefix (ECMP) route in an LPM routing table in the VTEP identification-selection database 406. As will be appreciated by one of skill in the art in possession of the present disclosure, the operations discussed above skip the programming of type-2 virtual machine/host IP addresses in the LPM routing table of the VTEP device 206. However, while a specific embodiment involving the BGP has been described, one of skill in the art in possession of the present disclosure will appreciate how other protocols may be utilized when associating the VTEP devices identifiers and virtual machine identifiers as discussed above while remaining within the scope of the present disclosure as well The method 500 then proceeds to block 506 where the first VTEP device identifies the association of the second VTEP device identifier(s) with the second virtual machines identifier(s) to a data provisioning device. With reference to FIGS. 8A, 8B, and 8C, in an embodiment of block 506, the VTEP device 206 may perform VTEP device identifier/virtual machine identifier association advertisement operations 800 that include the VTEP identification/selection engine 404 in the VTEP device 206/400 transmitting a VTEP device identifier/virtual machine identifier association advertisement via its communication system 408 and to the server device 202/300 such that it is received by the traffic forwarding engine 304 via its communication system 308. In a specific example, the VTEP device identifier/virtual machine identifier association advertisement operations 800 may be performed via communications using Link Layer Discovery Protocol (LLDP) Type Length Value (TLV) extensions, communications enabled by a centralized controller (not illustrated), and/or in a variety of other manners that would be apparent to one of skill in the art in possession of the present disclosure. As will be appreciated by one of skill in the art in possession of the present disclosure, the VTEP device identifier/virtual machine identifier association advertisement may identify the association of the VTEP device identifier "VTEP-2" for the VTEP device 208 with the virtual machine identifier "20.0.0.1" for the virtual machine 214*a* and the virtual machine identifier "20.0.0.10" for the virtual machine 214*b*, the association of the VTEP device identifier "VTEP-3" for the VTEP device 210 with the virtual machine identifier "20.0.0.11" for the virtual machine 216*a* and the virtual machine identifier "20.0.0.20" for the virtual machine 216*b*, and the association of the VTEP device identifier "VTEP-4" for the VTEP device 212 with the virtual machine identifier "20.0.0.21" for the virtual machine 218*a* and the virtual machine identifier "20.0.0.30" for the virtual machine 218*b*.

With continued reference to FIG. 8C, the traffic forwarding engine 304 in the server device 202/300 may perform VTEP device identifier/virtual machine identifier association storage operations 802 that include the traffic forwarding engine 304 associating the VTEP device identifier "VTEP-2" for the VTEP device 208 with the virtual machine identifier "20.0.0.1" for the virtual machine 214*a* and the virtual machine identifier "20.0.0.10" for the virtual machine 214*b*, associating the VTEP device identifier "VTEP-3" for the VTEP device 210 with the virtual machine identifier "20.0.0.11" for the virtual machine 216*a* and the virtual machine identifier "20.0.0.20" for the virtual machine 216*b*, and associating the VTEP device identifier "VTEP-4" for the VTEP device 212 with the virtual machine identifier "20.0.0.21" for the virtual machine 218*a* and the virtual machine identifier "20.0.0.30" for the virtual machine 218*b*.

As discussed below and as will be appreciated by one of skill in the art in possession of the present disclosure, at block 506 the traffic forwarding engine 304 in the server device 202/300 may also configure the traffic forwarding engine 304 to provide, in any data traffic that it receives for forwarding to a virtual machine, the VTEP device identifier that is associated with the virtual machine identifier for that virtual machine in the traffic forwarding database 306. As such, block 506 of the method 500 may include the configuration of a SmartNIC, a DPU, and/or other processing subsystem to utilize the VTEP device identifier/virtual machine identifier associations stored in the traffic forwarding database 306 for the forwarding of data traffic (e.g., a SmartNIC operating system may program a DPU in the SmartNIC to utilize the VTEP device identifier/virtual machine identifier associations for the forwarding of data traffic).

While the method 500 is illustrated and described as proceeding to and looping through blocks 508, 510, and 512 following block 506, one of skill in the art in possession of the present disclosure will appreciate how blocks 502, 504, and 506 may loop or be performed periodically throughout the method 500 such that the VTEP device 206 identifies virtual machines directly coupled to the VTEP devices 208, 210, and 212, associates VTEP device identifiers for the VTEP devices 208, 210, and 212 with virtual machine identifiers for their directly coupled virtual machines, and identifies those VTEP device identifier/virtual machine identifier associations to the server device 202. As such, as virtual machines are added to, removed from, and moved within the VTEP data traffic forwarding system 200 of the present disclosure, the VTEP device identifier/virtual machine identifier associations may be updated and identified to the server device 202.

The method 500 then proceeds to decision block 508 where it is determined whether data traffic including a second VTEP device identifier has been received. In an embodiment, at decision block 508, the VTEP identification/ selection engine 404 in the VTEP device 206/400 may receive data traffic from the server device 202 and determine whether that data traffic includes a VTEP device identifier. For example, when the VTEP identification/selection engine 404 receives data traffic, it may identify a destination IP address in that data traffic, and then perform a lookup operation in an LPM routing table in the VTEP identification-selection database 406. While the method 500 illustrated in FIG. 5 assumes that data traffic includes a destination route that is an ECMP route, one of skill in the art in possession of the present disclosure will appreciate how, in the event the lookup operation identifies a destination route that is not an ECMP route, the VTEP identification/selection engine 404 may perform a lookup operation in a level-2 next hop object table in the VTEP identification-selection database 406, and use the information identified as part of that lookup operation to encapsulate the data traffic and forward it to one of the VTEP devices 206, 208, or 210.

If, at decision block 508, it is determined that data traffic that does not include the second VTEP device identifier has been received, the method 500 proceeds to block 510 where the first VTEP device uses ECMP path selection to forward the data traffic. In an embodiment, at block 510 and in the event the lookup operation in the LPM routing table in the VTEP identification-selection database 406 identifies a destination route that is an ECMP route, the VTEP identification/selection engine 404 may determine whether a VTEP device identifier is included in the data traffic and, if not, may perform conventional ECMP path selection, perform a lookup operation in a level-2 next hop object table in the VTEP identification-selection database 406, and use the information identified as part of that lookup operation to encapsulate the data traffic and forward it to one of the VTEP devices 206, 208, or 210. The method 500 may then return to decision block 508. As such, the method 500 may loop such that the VTEP device 206 forwards data traffic using ECMP path selection as long as that data does not include a VTEP device identifier.

Figure 9A:
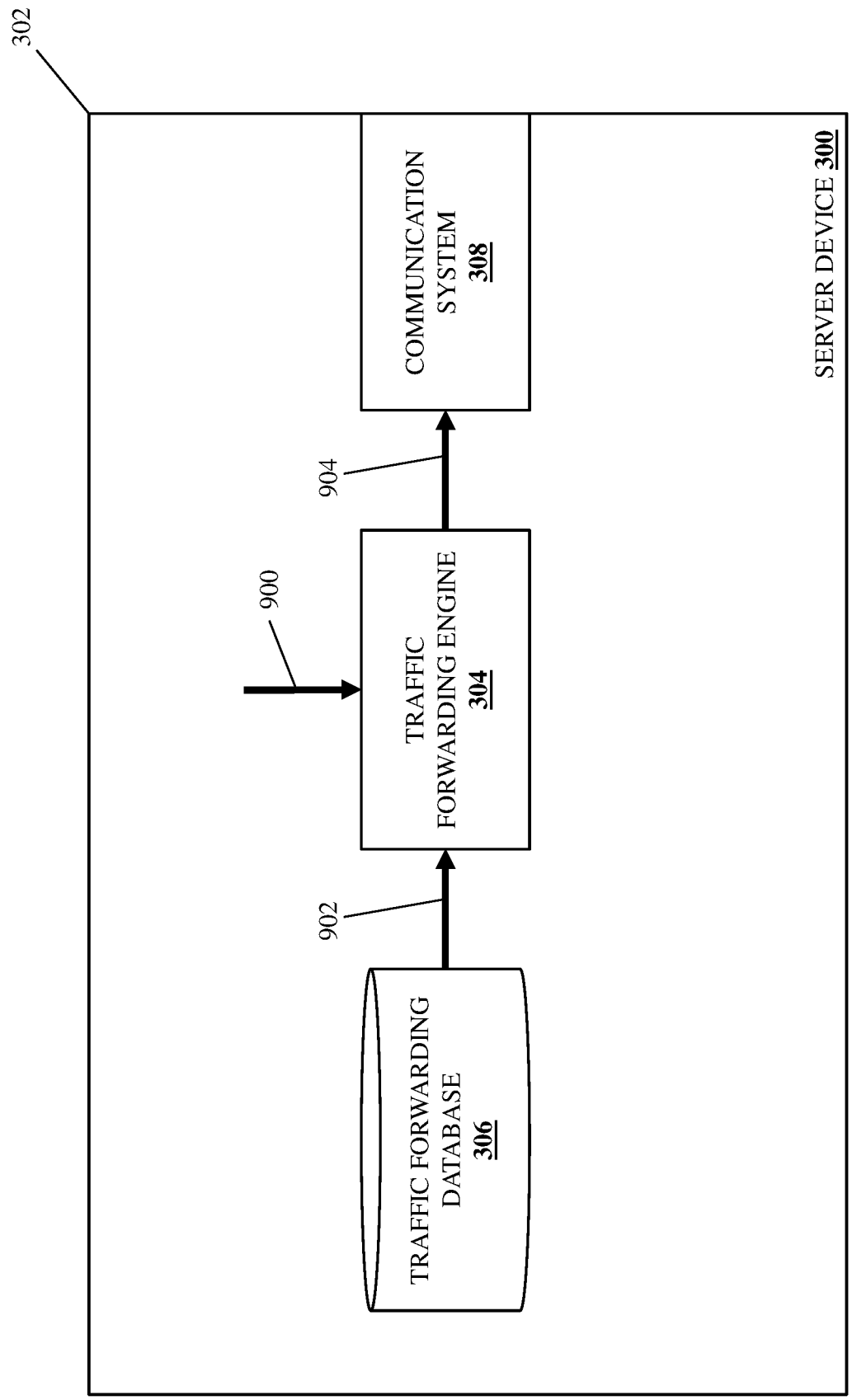
FIG. 9A is a schematic view illustrating an embodiment of the server device of FIG. 3 operating during the method of FIG. 5.

If at decision block 508, it is determined that data traffic that includes the second VTEP device identifier has been received, the method 500 proceeds to block 512 where the first VTEP device forwards the data traffic to a second VTEP device based on the second VTEP device identified included in the data traffic. With reference to FIG. 9A, in an embodiment of decision block 508, the traffic forwarding engine 304 in the server device 202/300 may perform data traffic receiving operations 900 that may include receiving data traffic for forwarding from the virtual machine 202a. However, while described as being received from a virtual machine, one of skill in the art in possession of the present disclosure will appreciate how the data traffic may be received from a device directly coupled to the server device 202/300, a device coupled to the server device via a network, a component in the server device 202/300, an application running on the server device 202/300, and/or from other hosts that would be apparent to one of skill in the art in possession of the present disclosure.

As discussed above, the traffic forwarding engine 304 in the server device 202/300 is configured to provide, in any data traffic that it receives for forwarding to a virtual machine, the VTEP device identifier that is associated with the virtual machine identifier for that virtual machine in the traffic forwarding database 306. As such, the traffic forwarding engine 304 may identify a virtual machine that is the destination of the data traffic received as part of the data traffic receiving operations 900 and, in response, perform VTEP device identifier retrieval operations 902 that include retrieving the VTEP device identifier associated with the virtual machine identifier for the virtual machine that is destination of the data traffic received as part of the data traffic receiving operations 900. The traffic forwarding engine 304 may then provide that VTEP device identifier in the data traffic via a header in the data packet, as metadata in the data packet, as a "tag" in the data packet, and/or using other techniques that would be apparent to one of skill in the art in possession of the present disclosure.

To provide a specific example, the data traffic may be received from the virtual machine 202a as part of the data traffic receiving operations 900 and may be directed to the virtual machine 218b and, as such, the traffic forwarding engine 304 in the server device 202/300 may identify a virtual machine identifier for the virtual machine 218b (e.g., the IP address "20.0.0.30" of the virtual machine 218b provided as a destination IP address in the data traffic), and then access the traffic forwarding database 306 and identify the VTEP device identifier for the VTEP device 212 (e.g., "VTEP-4") that is directly coupled to the virtual machine 218b (i.e., as that VTEP device identifier is and associated with the virtual machine identifier in the traffic forwarding database 306). The traffic forwarding engine 304 may then provide that VTEP device identifier for the VTEP device 212 (e.g., "VTEP-4") in the data traffic.

Figure 9B:
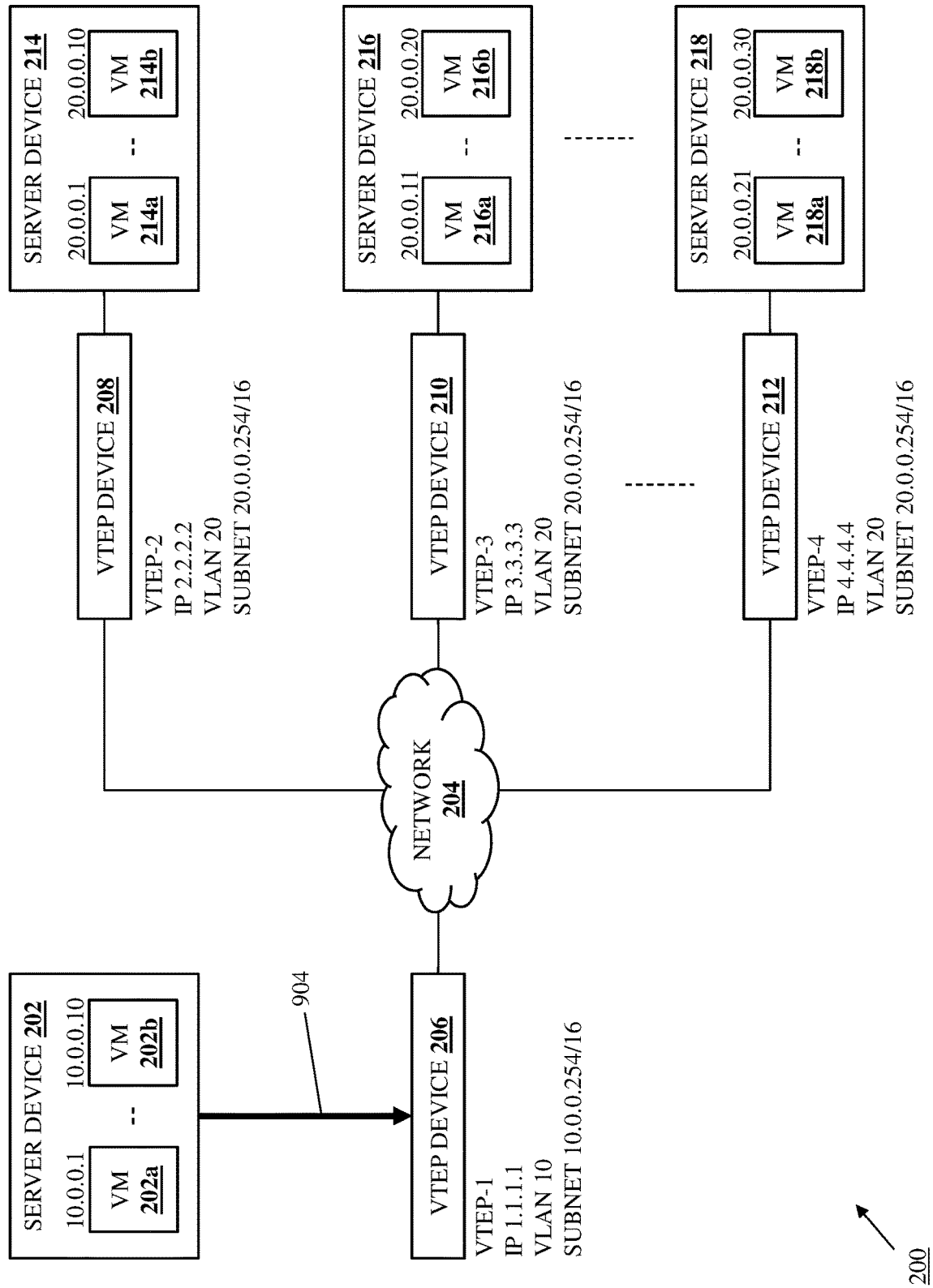
FIG. 9B is a schematic view illustrating an embodiment of the VTEP data traffic forwarding system of FIG. 2 operating during the method of FIG. 5.
Figure 9C:
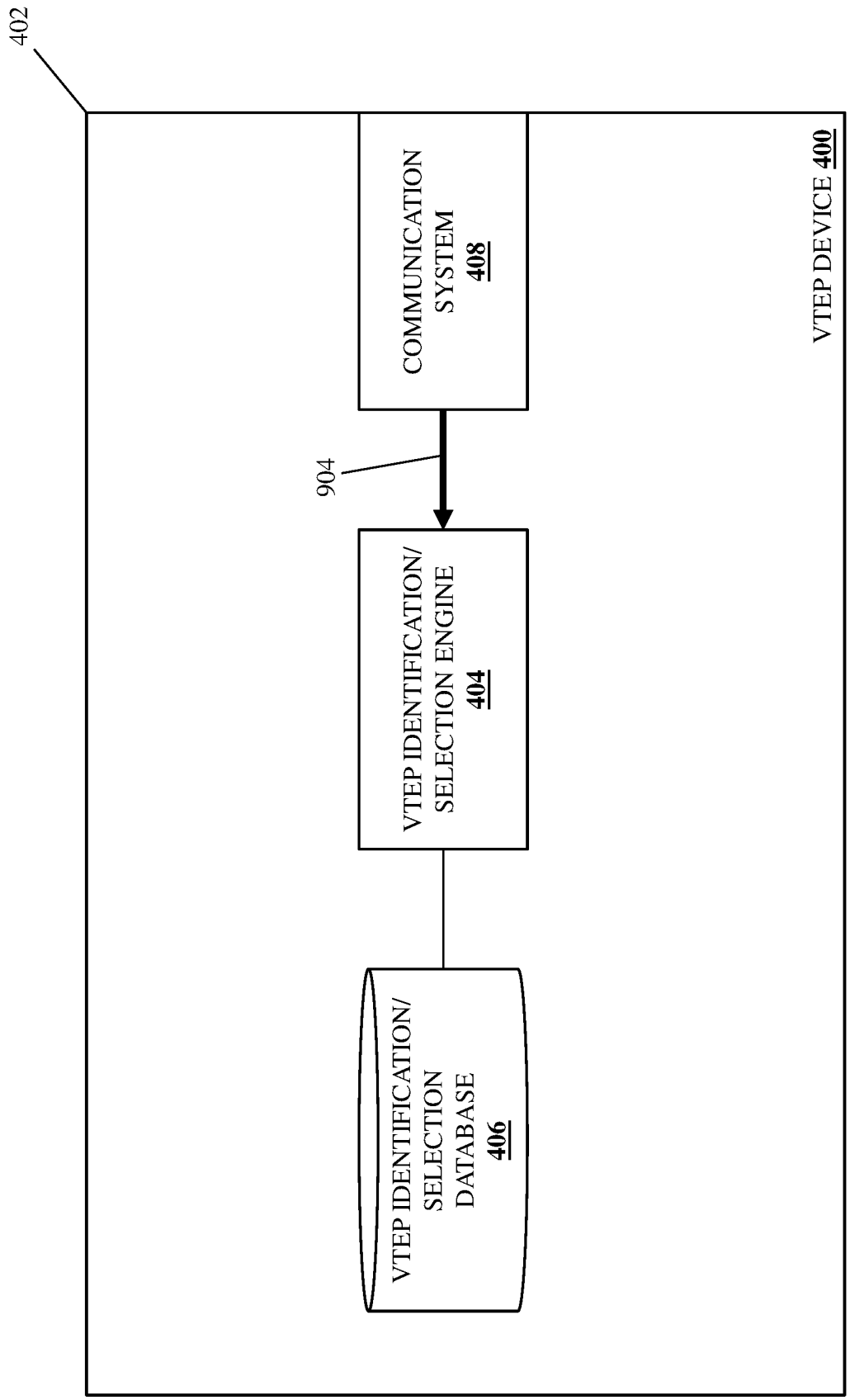
FIG. 9C is a schematic view illustrating an embodiment of the VTEP device of FIG. 4 operating during the method of FIG. 5.

With reference to FIGS. 9A, 9B, and 9C, the traffic forwarding engine 304 in the server device 202/300 may then perform data traffic forwarding operations 904 that include forwarding the data traffic via its communication system 308 and to the VTEP device 206/400 such that the VTEP identification/selection engine 404 receives that data traffic via its communication system 408. In response to receiving the data traffic, the traffic forwarding engine 304 will determine that the data traffic includes the VTEP device identifier at decision block 508, and the method 500 will proceed to block 512.

Figure 10A:
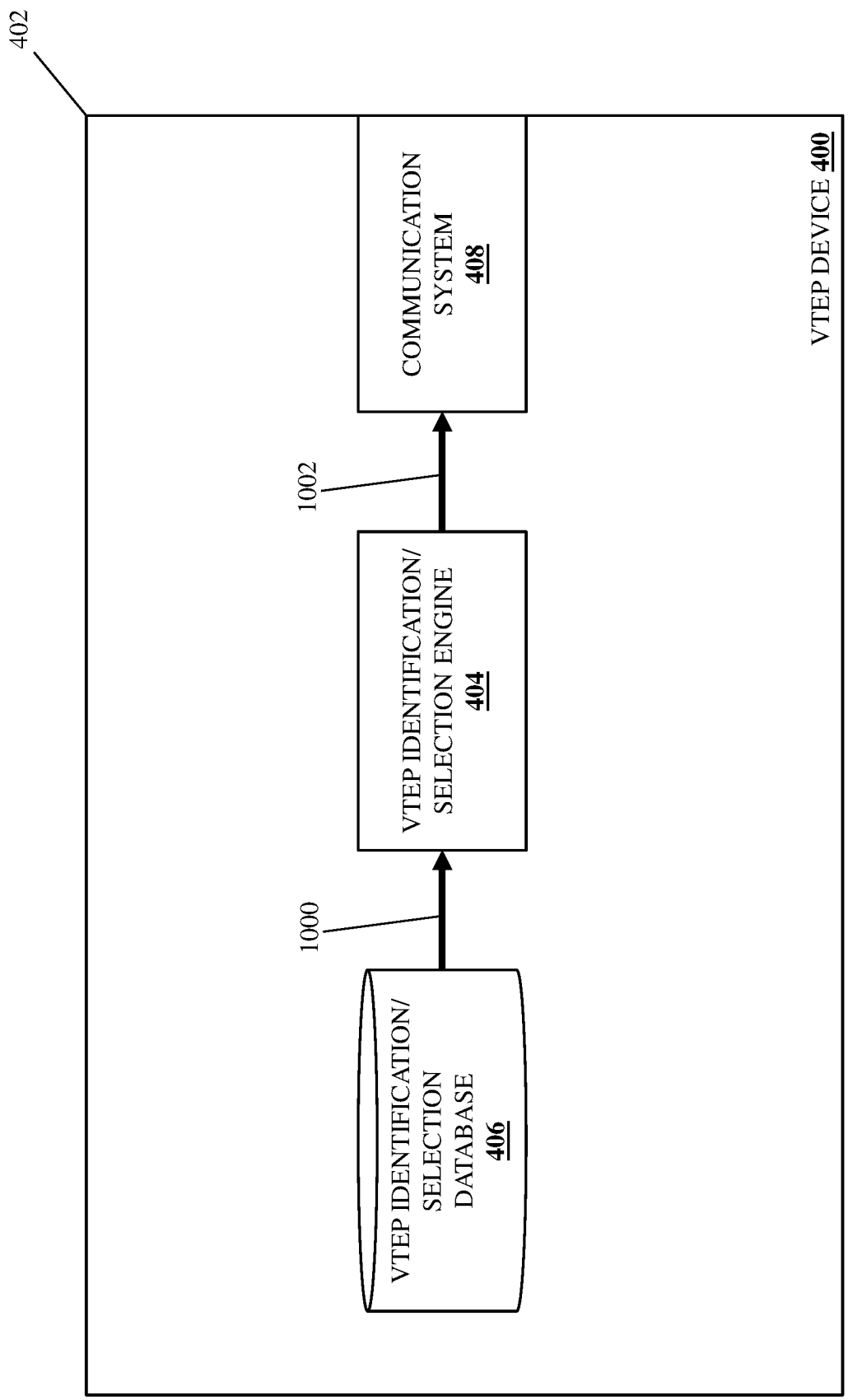
FIG. 10A is a schematic view illustrating an embodiment of the VTEP device of FIG. 4 operating during the method of FIG. 5.
Figure 10B:
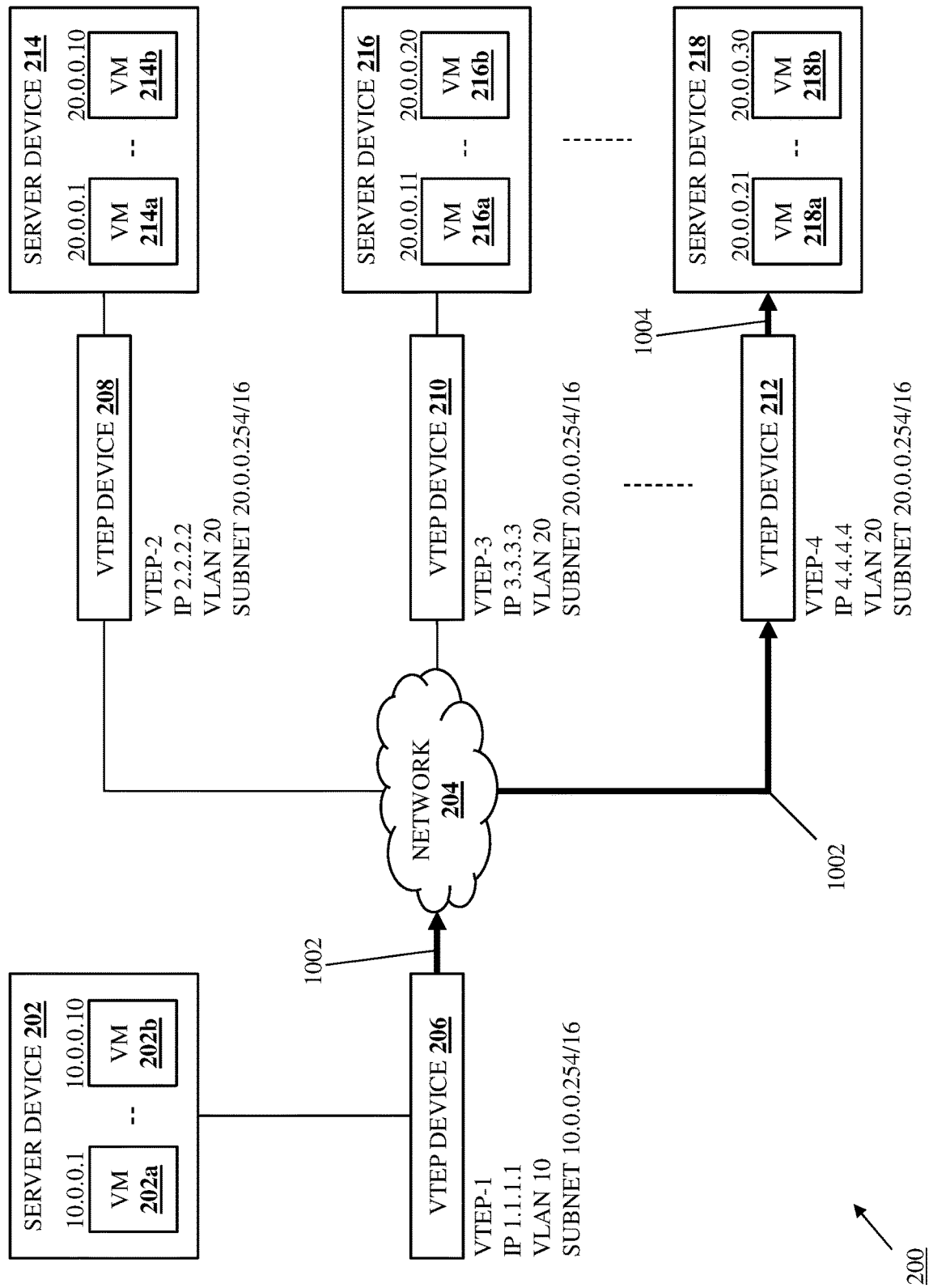
FIG. 10B is a schematic view illustrating an embodiment of the VTEP data traffic forwarding system of FIG. 2 operating during the method of FIG. 5.

With reference to FIG. 10A, at block 512 and in response to determine that the data traffic includes the VTEP device identifier, the VTEP identification/selection engine 404 in the VTEP device 206/400 may perform VTEP device identification operations 1000 that include identifying the VTEP device in the VTEP identification/selection database 406 using the VTEP device identifier included in the data traffic. Continuing with the specific example provided above, the VTEP identification/selection engine 404 may use the VTEP device identifier "VTEP-4" included in data traffic to access the VTEP identification/selection database 406 and identify the VTEP device 212 for that VTEP device identifier "VTEP-4" in the VTEP identification/selection database 406. To continue with the specific example above, the VTEP identification/selection engine 404 may use the level-1 ECMP table in the VTEP identification-selection database 406 that was programmed with the VTEP device identifier to identify a level-2 next hop object for the VTEP device. The VTEP identification/selection engine 404 may then encapsulate the data traffic (while removing the VTEP device identifier from the data traffic in some embodiments). As illustrated in FIGS. 10A and 10B, the VTEP identification/selection engine 404 may then perform data traffic forwarding operations 1002 that include transmitting the data traffic via its communication system 408 and through the network 204 to the VTEP device 212, with the VTEP device 212 performing data traffic forwarding operations 1004 to forward the data traffic to the virtual machine 218b. As such, the "traffic tromboning" illustrated and described above with reference to FIGS. 6A and 6B is eliminated without the need to provide an "exact-match" IP address for each of the virtual machines 214a-214b, 216a-216b, and 218a-218b in a routing table in the VTEP device 206.

As discussed above, the VTEP device identifier/virtual machine identifier associations may be updated and identified to the server device 202 as virtual machines are added to, removed from, and moved within the VTEP data traffic forwarding system of the present disclosure. In one example, in response to identifying the movement of a virtual machine to a new server device (e.g., movement of the virtual machine 218b from the server device 218 to the server device 216), the VTEP identification/selection engine 404 in the VTEP device 206/400 may remove the "old" VTEP device identifier/virtual machine identifier association (e.g., the "VTEP-4"/"20.0.0.30" association) from the VTEP identification/selection database 406, and add the "new" VTEP device identifier/virtual machine identifier association (e.g., a "VTEP-3"/"20.0.0.30" association) to the VTEP identification/selection database 406. The VTEP identification/selection engine 404 may also identify the "new" VTEP device identifier/virtual machine identifier association to the traffic forwarding engine 404 in the server device 202/300 so that it removes the "old" VTEP device identifier/virtual machine identifier association (e.g., the "VTEP-4"/"20.0.0.30" association) from the traffic forwarding database 306, and add the "new" VTEP device identifier/virtual machine identifier association (e.g., a "VTEP-3"/"20.0.0.30" association) to the traffic forwarding database 306, and provides the VTEP device identifier (e.g., "VTEP-3") in subsequent data traffic destined for the virtual machine 218b.

In another example, in response to identifying the unavailability of a VTEP device (e.g., the VTEP device 212 has failed, 'gone down", or otherwise become unavailable), the VTEP identification/selection engine 404 in the VTEP device 206/400 may remove the VTEP device identifier/virtual machine identifier associations for that VTEP device from the VTEP identification/selection database 406, and identify the unavailability of the VTEP device to the traffic forwarding engine 404 in the server device 202/300 so that it removes the VTEP device identifier/virtual machine identifier associations for that VTEP device from the traffic forwarding database 306.

Thus, systems and methods have been described that provide for the identification to a data provisioning device of virtual machines that are directly coupled to VTEP devices, allowing the data provisioning device to identify the VTEP device through which data traffic should be forwarded in order to efficiently reach any of the virtual machines. For example, the VTEP data traffic forwarding system of the present disclosure may include a second VTEP device coupled to a data traffic provisioning device and a first VTEP device. The second VTEP device identifies a virtual machine directly coupled to the first VTEP device, associates a first VTEP device identifier for the first VTEP device in a database with a virtual machine identifier for the virtual machine, and identifies the association of the first VTEP device identifier and the virtual machine identifier to the data traffic provisioning device, with the association of the first VTEP device identifier and the virtual machine identifier causing the data traffic provisioning device to provide the first VTEP device identifier in data traffic destined for the virtual machine. The second VTEP device then receives data traffic including the first VTEP device identifier from the data traffic provisioning device and, in response, forwards the data traffic to the first VTEP device. As such, the systems and methods of the present disclosure provide distributed data plane programming logic across a data provisioning device and a VTEP device for overlay ECMP path selection via the exchange of VTEP device identifier/virtual machine identifier associations that achieve optimized data path forwarding.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Virtual Extensible Local Area Network (VxLAN) Tunnel End Point (VTEP) data traffic forwarding system, comprising:
 a first Virtual Extensible Local Area Network (VxLAN) Tunnel End Point (VTEP) device that is directly coupled to a first virtual machine;
 a data traffic provisioning device; and
 a second VTEP device that is coupled to the first VTEP device and the data traffic provisioning device, wherein the second VTEP device is configured to:
  identify the first virtual machine that is directly coupled to the first VTEP device;
  associate, in a database, a first VTEP device identifier for the first VTEP device with a first virtual machine identifier for the first virtual machine that is directly coupled to the first VTEP device;
  identify, to the data traffic provisioning device, the association of the first VTEP device identifier and the first virtual machine identifier, wherein the association of the first VTEP device identifier and the first virtual machine identifier is configured to cause the data traffic provisioning device to provide the first VTEP device identifier in data traffic destined for the first virtual machine;
  receive, from the data traffic provisioning device, first data traffic including the first VTEP device identifier; and
  forward, based on the first VTEP device identifier being included in the first data traffic, the first data traffic to the first VTEP device.

2. The system of claim 1, wherein the forwarding the first data traffic to the first VTEP device based on the first VTEP device identifier being included in the first data traffic includes:
 performing overlay Equal Cost Multi Path (ECMP) selection operations based on the first VTEP device identifier being included in the first data traffic.

3. The system of claim 1, further comprising:
 a third VTEP device, wherein the second VTEP device is configured to:
  determine that the first virtual machine has moved and is directly coupled to the third VTEP device;
  remove, from the database in response to determining that the first virtual machine has moved and is directly coupled to the third VTEP device, the association of the first VTEP device identifier for the first VTEP device and the first virtual machine identifier for the first virtual machine;
  associate, in the database, a third VTEP device identifier for the third VTEP device with the first virtual machine identifier for the first virtual machine that is directly coupled to the third VTEP device; and
  identify, to the data traffic provisioning device, the association of the third VTEP device identifier and the first virtual machine identifier, wherein the association of the third VTEP device identifier and the first virtual machine identifier is configured to cause the data traffic provisioning device to provide the third VTEP device identifier in data traffic destined for the first virtual machine.

4. The system of claim 1, wherein the second VTEP device is configured to:
determine that the first VTEP device is unavailable;
remove, from the database in response to determining that the first VTEP device is unavailable, the association of the first VTEP device identifier for the first VTEP device and the first virtual machine identifier for the first virtual machine; and
identify, to the data traffic provisioning device, the removal of the association of the first VTEP device identifier and the first virtual machine identifier, wherein the removal of the association of the first VTEP device identifier and the first virtual machine identifier is configured to prevent the data traffic provisioning device from providing the first VTEP device identifier in data traffic destined for the first virtual machine.

5. The system of claim 1, wherein the second VTEP device is configured to:
provide the first VTEP device identifier in a Level 1 Equal Cost Multi Path (ECMP) table.

6. The system of claim 1, further comprising:
a third VTEP device that is coupled to the second VTEP device and that is directly coupled to a third virtual machine, wherein the second VTEP device is configured to:
identify the third virtual machine that is directly coupled to the third VTEP device;
associate, in the database, a third VTEP device identifier for the third VTEP device with a third virtual machine identifier for the third virtual machine that is directly coupled to the third VTEP device;
identify, to the data traffic provisioning device, the association of the third VTEP device identifier and the third virtual machine identifier, wherein the association of the third VTEP device identifier and the third virtual machine identifier is configured to cause the data traffic provisioning device to provide the third VTEP device identifier in data traffic destined for the third virtual machine;
receive, from the data traffic provisioning device, second data traffic including the third VTEP device identifier; and
forward, based on the third VTEP device identifier being included in the second data traffic, the second data traffic to the third VTEP device.

7. The system of claim 1, wherein the data traffic provisioning device includes a Smart Network Interface Controller (SmartNIC) device.

8. An Information Handling System (IHS), comprising:
a processing system; and
a memory system that is coupled to the processing system and that includes instructions that, when executed by the processing system, cause the processing system to provide a Virtual Extensible Local Area Network (VxLAN) Tunnel End Point (VTEP) identification/selection engine that is configured to:
identify a first virtual machine that is directly coupled to a first VTEP device;
associate, in a database, a first VTEP device identifier for the first VTEP device with a first virtual machine identifier for the first virtual machine that is directly coupled to the first VTEP device;
identify, to a data traffic provisioning device, the association of the first VTEP device identifier and the first virtual machine identifier, wherein the association of the first VTEP device identifier and the first virtual machine identifier is configured to cause the data traffic provisioning device to provide the first VTEP device identifier in data traffic destined for the first virtual machine;
receive, from the data traffic provisioning device, first data traffic including the first VTEP device identifier; and
forward, based on the first VTEP device identifier being included in the first data traffic, the first data traffic to the first VTEP device.

9. The IHS of claim 8, wherein the forwarding the first data traffic to the first VTEP device based on the first VTEP device identifier being included in the first data traffic includes:
performing overlay Equal Cost Multi Path (ECMP) selection operations based on the first VTEP device identifier being included in the first data traffic.

10. The IHS of claim 8, wherein the VTEP identification/selection engine is configured to:
determine that the first virtual machine has moved and is directly coupled to a second VTEP device;
remove, from the database in response to determining that the first virtual machine has moved and is directly coupled to the second VTEP device, the association of the first VTEP device identifier for the first VTEP device and the first virtual machine identifier for the first virtual machine;
associate, in the database, a second VTEP device identifier for the second VTEP device with the first virtual machine identifier for the first virtual machine that is directly coupled to the second VTEP device; and
identify, to the data traffic provisioning device, the association of the second VTEP device identifier and the first virtual machine identifier, wherein the association of the second VTEP device identifier and the first virtual machine identifier is configured to cause the data traffic provisioning device to provide the second VTEP device identifier in data traffic destined for the first virtual machine.

11. The IHS of claim 8, wherein the VTEP identification/selection engine is configured to:
determine that the first VTEP device is unavailable;
remove, from the database in response to determining that the first VTEP device is unavailable, the association of the first VTEP device identifier for the first VTEP device and the first virtual machine identifier for the first virtual machine; and
identify, to the data traffic provisioning device, the removal of the association of the first VTEP device identifier and the first virtual machine identifier, wherein the removal of the association of the first VTEP device identifier and the first virtual machine identifier is configured to prevent the data traffic provisioning device from providing the first VTEP device identifier in data traffic destined for the first virtual machine.

12. The IHS of claim 8, wherein the VTEP identification/selection engine is configured to:
provide the first VTEP device identifier in a Level 1 Equal Cost Multi Path (ECMP) table.

13. The IHS of claim 8, wherein the first VTEP device is configured to:
  identify a second virtual machine that is directly coupled to a second VTEP device;
  associate, in the database, a second VTEP device identifier for the second VTEP device with a second virtual machine identifier for the second virtual machine that is directly coupled to the second VTEP device;
  identify, to the data traffic provisioning device, the association of the second VTEP device identifier and the second virtual machine identifier, wherein the association of the second VTEP device identifier and the second virtual machine identifier is configured to cause the data traffic provisioning device to provide the second VTEP device identifier in data traffic destined for the second virtual machine;
  receive, from the data traffic provisioning device, second data traffic including the second VTEP device identifier; and
  forward, based on the second VTEP device identifier being included in the second data traffic, the second data traffic to the second VTEP device.

14. A method for forwarding data traffic via a Virtual Extensible Local Area Network (VxLAN) Tunnel End Point (VTEP) device, comprising:
  identifying, by a first Virtual Extensible Local Area Network (VxLAN) Tunnel End Point (VTEP) device, a second virtual machine that is directly coupled to a second VTEP device;
  associating, by the first VTEP device in a database, a second VTEP device identifier for the second VTEP device with a second virtual machine identifier for the second virtual machine that is directly coupled to the second VTEP device;
  identifying, by the first VTEP device to a data traffic provisioning device, the association of the second VTEP device identifier and the second virtual machine identifier, wherein the association of the second VTEP device identifier and the second virtual machine identifier is configured to cause the data traffic provisioning device to provide the second VTEP device identifier in data traffic destined for the second virtual machine;
  receiving, by the first VTEP device from the data traffic provisioning device, first data traffic including the second VTEP device identifier; and
  forwarding, by the first VTEP device based on the first VTEP device identifier being included in the first data traffic, the first data traffic to the second VTEP device.

15. The method of claim 14, wherein the forwarding the first data traffic to the second VTEP device based on the second VTEP device identifier being included in the first data traffic includes:
  performing overlay Equal Cost Multi Path (ECMP) selection operations based on the second VTEP device identifier being included in the first data traffic.

16. The method of claim 14, further comprising:
  determining, by the first VTEP device, that the second virtual machine has moved and is directly coupled to a third VTEP device;
  removing, by the first VTEP device from the database in response to determining that the second virtual machine has moved and is directly coupled to the third VTEP device, the association of the second VTEP device identifier for the second VTEP device and the second virtual machine identifier for the second virtual machine;
  associating, by the first VTEP device in the database, a third VTEP device identifier for the third VTEP device with the second virtual machine identifier for the second virtual machine that is directly coupled to the third VTEP device; and
  identifying, by the first VTEP device to the data traffic provisioning device, the association of the third VTEP device identifier and the second virtual machine identifier, wherein the association of the third VTEP device identifier and the second virtual machine identifier is configured to cause the data traffic provisioning device to provide the third VTEP device identifier in data traffic destined for the second virtual machine.

17. The method of claim 14, further comprising:
  determining, by the first VTEP device, that the second VTEP device is unavailable;
  removing, by the first VTEP device from the database in response to determining that the second VTEP device is unavailable, the association of the second VTEP device identifier for the second VTEP device and the second virtual machine identifier for the second virtual machine; and
  identifying, by the first VTEP device to the data traffic provisioning device, the removal of the association of the second VTEP device identifier and the second virtual machine identifier, wherein the removal of the association of the second VTEP device identifier and the second virtual machine identifier is configured to prevent the data traffic provisioning device from providing the second VTEP device identifier in data traffic destined for the second virtual machine.

18. The method of claim 14, further comprising:
  providing, by the first VTEP device, the second VTEP device identifier in a Level 1 Equal Cost Multi Path (ECMP) table.

19. The method of claim 14, further comprising:
  identifying, by the first VTEP device, a third virtual machine that is directly coupled to a third VTEP device;
  associating, by the first VTEP device in the database, a third VTEP device identifier for the third VTEP device with a third virtual machine identifier for the third virtual machine that is directly coupled to the third VTEP device;
  identifying, by the first VTEP device to the data traffic provisioning device, the association of the third VTEP device identifier and the third virtual machine identifier, wherein the association of the third VTEP device identifier and the third virtual machine identifier is configured to cause the data traffic provisioning device to provide the third VTEP device identifier in data traffic destined for the third virtual machine;
  receiving, by the first VTEP device from the data traffic provisioning device, second data traffic including the third VTEP device identifier; and
  forwarding, by the first VTEP device based on the third VTEP device identifier being included in the second data traffic, the second data traffic to the third VTEP device.

20. The method of claim 14, wherein the data traffic provisioning device includes a Smart Network Interface Controller (SmartNIC) device.

* * * * *